(12) United States Patent
Eleftheriou et al.

(10) Patent No.: US 10,949,735 B2
(45) Date of Patent: *Mar. 16, 2021

(54) ARTIFICIAL NEURON APPARATUS

(71) Applicant: SAMSUNG ELECTRONICS CO., LTD., Suwon-si (KR)

(72) Inventors: Evangelos S. Eleftheriou, Rueschlikon (CH); Angeliki Pantazi, Thalwil (CH); Abu Sebastian, Adliswil (CH); Tomas Tuma, Adliswil (CH)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,527

(22) Filed: Jun. 9, 2019

(65) Prior Publication Data

US 2019/0294952 A1 Sep. 26, 2019

Related U.S. Application Data

(63) Continuation of application No. 14/742,690, filed on Jun. 17, 2015, now Pat. No. 10,318,861.

(51) Int. Cl.
*G06N 3/04* (2006.01)
*G06N 3/063* (2006.01)

(52) U.S. Cl.
CPC ........... *G06N 3/049* (2013.01); *G06N 3/0635* (2013.01)

(58) Field of Classification Search
CPC ............................ G06N 3/049; G06N 3/0635
USPC .......................................................... 706/41
See application file for complete search history.

(56) References Cited

U.S. PATENT DOCUMENTS

| 5,778,152 A | * | 7/1998 | Oki | ........................ G06N 3/08 |
| | | | | 706/25 |
| 6,501,294 B2 | | 12/2002 | Bernstein et al. | |
| 6,999,953 B2 | | 2/2006 | Ovhsinsky | |
| 7,050,328 B2 | | 5/2006 | Khouri et al. | |

(Continued)

FOREIGN PATENT DOCUMENTS

WO    WO 2014/135801    9/2014

OTHER PUBLICATIONS

Phase Change Memory as Synapse for Ultra-Dense Neuromorphic Systems: Application to Complex Visual Pattern Extraction Suri et al. (Year: 2010).*

(Continued)

*Primary Examiner* — Kakali Chaki
*Assistant Examiner* — Ababacar Seck
(74) *Attorney, Agent, or Firm* — NSIP Law

(57) ABSTRACT

A resistive memory cell is connected in circuitry which has a first input terminal for applying neuron input signals including a read portion and a write portion. The circuitry includes a read circuit producing a read signal dependent on resistance of the memory cell, and an output terminal providing a neuron output signal, dependent on the read signal in a first state of the memory cell. The circuitry also includes a storage circuit storing a measurement signal dependent on the read signal, and a switch set operable to supply the read signal to the storage circuit during application of the read portion of each neuron input signal to the memory cell, and, after application of the read portion, to apply the measurement signal in the apparatus to enable resetting of the memory cell to a second state.

26 Claims, 20 Drawing Sheets

(56) References Cited

U.S. PATENT DOCUMENTS

| | | | |
|---|---|---|---|
| 8,311,965 | B2 | 11/2012 | Breitwisch et al. |
| 8,473,439 | B2 | 6/2013 | Arthur et al. |
| 8,959,040 | B1 | 2/2015 | Cruz-Albrecht et al. |
| 10,282,657 | B2 | 5/2019 | Pantazi et al. |
| 2002/0030205 | A1* | 3/2002 | Varshavsky ............ G06N 3/063 257/208 |
| 2006/0294034 | A1 | 12/2006 | Fuji |
| 2009/0200533 | A1 | 8/2009 | Ufert et al. |
| 2010/0214819 | A1 | 8/2010 | Kim et al. |
| 2011/0032747 | A1 | 2/2011 | Yoon et al. |
| 2011/0182107 | A1* | 7/2011 | Wu ....................... H01L 45/145 365/148 |
| 2012/0088219 | A1* | 4/2012 | Briscoe ................. G06N 20/00 434/362 |
| 2012/0150781 | A1 | 6/2012 | Arthur et al. |
| 2012/0230081 | A1* | 9/2012 | Close ..................... G11C 5/147 365/148 |
| 2013/0311414 | A1* | 11/2013 | Nishitani .............. G06N 3/049 706/25 |
| 2014/0172762 | A1 | 6/2014 | Suri et al. |
| 2014/0198559 | A1* | 7/2014 | Perner ................ G11C 13/0007 365/148 |
| 2015/0006455 | A1 | 1/2015 | Suri et al. |
| 2015/0039547 | A1 | 2/2015 | Kang et al. |
| 2015/0364193 | A1 | 12/2015 | Shimakawa et al. |
| 2016/0371582 | A1 | 12/2016 | Eleftheriou et al. |

OTHER PUBLICATIONS

Beyond von-Neumann Computing with Nanoscale Phase-Change Memory Devices Wright et al. (Year: 2013).*

C. David Wright et al, Novel applications possibilities for phase-change materials and devices. E\PCOS 2013, pp. 1-6. 2013.

Andrew Czyzewski, Phase-change' materials could enable brain-like computing. Downloaded from http://www.theengineer.co.uk/more-sectors/electronics/news/phase-change-materials-could-enable-brain-like-computing/1009227.articleon Jun. 5, 2015 Jul. 1, 2011 pp. 1-2.

Hamid Soleimani et al, A generalized analog implementation of piecewise linear neuron models using CCII building blocks. Neural Networks; vol. 51, Mar. 2014, pp. 26-38.

A. L. Hodgkin, The Dual Effect of Membrane Potential on Sodium Conductance in the Giant Axon of Loligo. J. Physiol. (1952) ii6, 497-506.

Eugene M. Izhikevich, Simple Model of Spiking Neurons. IEEE Transactions on Neural Networks, vol. 14, No. 6, Nov. 2003, pp. 1569-1572.

Stanford R. Ovshinsky, The Ovonic Cognitive Computer—A New Paradigm. 2004, Energy Conversion Devices, Inc. pp. 1-8.

Giacomo Indiveri, Neuromorphic silicon neuron circuits. Frontiers in Neurosci., May 31, 2011, pp. 1-23.

Wright CD, Hosseini P, Diosdado JA. Beyond von-Neumann computing with nanoscale phase-change memory devices. Advanced Functional Materials. May 13, 2013;23(18):2248-54. (p. 1-7, First published: Dec. 12, 2012).

Suri M, Bichler O, Querlioz D, Cueto O, Perniola L, Sousa V, Vuillaume D, Gamrat C, DeSalvo B. Phase change memory as synapse for ultra-dense neuromorphic systems: Application to complex visual pattern extraction. In2011 International Electron Devices Meeting Dec. 5, 2011 (Cover Plus pp. 1-4). IEEE.

Paul J. Otterstedt, List of IBM Patents or Patent Applications Treated as Related, Jun. 9, 2019, pp. 1-2.

* cited by examiner

Post-neuron fires

ARTIFICIAL NEURON APPARATUS

CROSS-REFERENCE TO RELATED APPLICATIONS

This application is a continuation of U.S. patent application Ser. No. 14/742,690 filed on Jun. 17, 2015, now U.S. Pat. No. 10,318,861 issued on Jun. 11, 2019, the complete disclosure of which is expressly incorporated herein by reference in its entirety for all purposes.

BACKGROUND

The present invention relates generally to an artificial neuron apparatus, and more particularly to artificial neurons based on resistive memory cells.

Neuromorphic technology relates to computing systems which are inspired by biological architectures of the nervous system. The conventional computing paradigm based on CMOS logic and von Neumann architecture is becoming increasingly inadequate to meet the expanding processing demands placed on modern computer systems. Compared to biological systems, it is also highly inefficient in terms of power consumption and space requirements. For example, the IBM Watson supercomputer, which recently won the Jeopardy contest against two human contestants, has 2880 computing cores (the size of 10 refrigerators) and requires about 80 kW of power and 20 tonnes of air-conditioned cooling capacity. The human brain occupies less than 2 liters and consumes around 20 W of power. Simulating 5 seconds of brain activity using state-of-the-art supercomputers takes around 500 seconds and needs 1.4 MW of power. These issues have prompted a significant research effort to understand the highly efficient computational paradigm of the human brain and to create artificial cognitive systems with unprecedented computing power.

Neurons and synapses are two basic computational units in the brain. A neuron can integrate input signals coming from other neurons, in some cases with further inputs, for example from sensory receptors. At some point the neuron will "fire", generating an output signal known as an "action potential" or "spike", and then revert to its initial state. The spikes are conveyed to other neurons via synapses which change their connection strength as a result of neuronal activity. FIG. 1 of the accompanying drawings shows a schematic representation of two neurons N1, N2 interconnected via a synapse 1. Neuron N1 integrates inputs from other neurons, sensory receptors, etc., which it receives via dendrites 2. When neuron N1 fires, it generates a spike which is conveyed to other neurons via an axon 3 of N1. The synapse 1 interconnecting pre-synaptic neuron N1 and post-synaptic neuron N2 receives spikes generated by neuron N1 and provides output signals to neuron N2. The resulting synaptic output signal is conveyed to neuron N2 via a dendrite 4 of N2. This synaptic output signal is a graded synaptic potential which depends on conductance (also known as "synaptic weight" or "strength") of the synapse 1. Synaptic weight can be enhanced or reduced by neuronal activity, and this "plasticity" of synapses is crucial to memory and other brain functions. This effect is indicated in FIG. 1 by back-propagation of a spike generated by N2 to the synapse 1 via a dendrite 5 of neuron N2. The spike generated by N2 is conveyed to other neurons via an axon 6 of N2.

Most current artificial neuron realizations are based on hybrid analog/digital VLSI circuits. These so-called silicon neurons require several transistors to be realized and are not particularly suitable for integration with emerging nanoscale devices such as resistive memory cells (memristors). Resistive memory cells such as phase change memory (PCM) cells have been recognized as suitable candidates for the realization of neural hardware (see e.g., "The Ovonic Cognitive Computer—A New Paradigm", Ovshinsky, Proc. E/PCOS, 2004, and "Novel Applications Possibilities for Phase-Change Materials and Devices", Wright et al., Proc. E/PCOS, 2013). Resistive memory cells are programmable-resistance devices which rely on the variable resistance characteristics of a volume of resistive material disposed between a pair of electrodes. Cell resistance can be programmed by application of control signals ("programming" or "write" signals) to the electrodes. These cells exhibit a threshold-switching effect whereby the cell can be switched between high and low resistance states by applying a control signal above a threshold level. By appropriate adjustment of the control signals, cells may be programmed to a range of intermediate resistance values, whereby application of successive signals can progressively modify cell-resistance. The cell-resistance can be measured (or "read") by applying a low-voltage control signal to the electrodes and measuring the resulting current flow through the cell. The control signal level for the read operation is low enough that the read operation does not disturb the programmed cell-state.

Prior proposals for neuromorphic neurons based on resistive memory cells were only aimed at capturing some characteristics of biological neurons such as the integrate-and-fire functionality. There have also been attempts at using such memory elements to emulate the generation of action potentials in biological neurons. There has been no concrete proposal for realizing a ready-to-integrate artificial neuron for neuromorphic hardware that can capture most of the essential attributes of a biological neuron.

SUMMARY

According to at least one embodiment of the present invention there is provided artificial neuron apparatus. The apparatus includes a resistive memory cell connected in circuitry having a first input terminal for applying neuron input signals, each including a read portion and a write portion, to the memory cell. The circuitry includes a read circuit for producing a read signal dependent on resistance of the memory cell, and an output terminal for providing a neuron output signal dependent on the read signal in a first state, being one of a low-resistance state and a high-resistance state, of the memory cell. The circuitry further includes a storage circuit for storing a measurement signal dependent on the read signal, and a switch set. The switch set is operable to supply the read signal to the storage circuit during application of the read portion of each neuron input signal to the memory cell, and, after application of the read portion, to apply the measurement signal in the apparatus to enable resetting of the memory cell from said first state to a second state, being the other of said low-resistance and high-resistance states. The apparatus is adapted such that resistance of the memory cell is progressively changed from said second state to said first state by application of the write portions of successive neuron input signals to the cell.

Embodiments of the invention provide neuron implementations which demonstrate key attributes of an artificial neuron and permit connectivity and operation in a neuromorphic network configuration. The apparatus enables operation of the resistive memory cell to be exploited to allow the neuron effectively to accumulate neuron input signals and "fire", providing the neuron output signal (spike), when the cell-resistance reaches the aforementioned first state. This state is indicated by the read signal. Additionally, through operation of the switch set, the storage circuit receives the read signal and stores the measurement signal which is then applied to reset the memory cell when the neuron has fired. After the read portion of a neuron input signal prompting a spike event, the neuron is thus reset to the original pre-accumulation second state at the same spike event. Apparatus embodying the invention offers practical neuron realizations which can readily replace silicon neurons, with significant advantage in terms of reducing complexity and chip area. Such neuron realizations are eminently suitable for integration with other components, such as neuromorphic synapses based on resistive memory cells, in neuromorphic systems, providing a basis for viable all-resistive-cell neural hardware.

In some embodiments, the first state of the memory cell is the low-resistance state and the apparatus is adapted such that that resistance of the memory cell is progressively reduced by application of the write portions of successive neuron input signals to the cell. In other embodiments, the first state of the memory cell is the high-resistance state and the apparatus is adapted such that that resistance of the memory cell is progressively increased by application of the write portions of successive neuron input signals.

In preferred embodiments, the circuitry is adapted such that the measurement signal increases as resistance of the memory cell progresses between the second and first states. The storage circuit here may conveniently include an integrator circuit. Advantageously, this is a leaky integrator circuit. The measurement signal thus leaks away after the cell-read phase, obviating any need to reset the measurement signal between neuron input signals which may otherwise be desirable in some cases.

In some embodiments, the switch set is operable to supply the measurement signal to the first input terminal during application of the write portion of each neuron input signal to the memory cell. Such embodiments can be adapted such that, in the first state of the memory cell, supply of the measurement signal to the first input terminal effects resetting of the memory cell to the second state. This simple arrangement allows the measurement signal obtained during the read portion of a neuron input signal to be supplied to the first input terminal during application of the next write portion of a neuron input signal. These embodiments can use a simple switch set with two switches configurable in response to the neuron input signals, in particular in response to the read and write portions thereof.

In other embodiments, each neuron input signal may include a reset portion after the read portion thereof. In these embodiments, the apparatus can include a second input terminal for receiving, during the reset portion of each neuron input signal, a reset signal for resetting the memory cell from the first state to the second state. These embodiments, examples of which will be described below, permit use of a well-defined, arbitrarily-shaped reset pulse for resetting the cell. Particular embodiments here offer simple circuit implementations with a structure and operation closely aligned to a resistive memory cell synapse architecture. These embodiments, detailed below, are tailored to the needs of combined synapse-neuron array with uniform elements, and offer the possibility of reconfigurable neuron-synapse operation.

In some embodiments, the neuron output signal (spike) may include the read signal in the first cell-state. In other embodiments, the spike may be a signal produced in dependence on the read signal, e.g., by an output circuit which receives the read signal, or the measurement signal, at least in the first cell-state. Implementations and further advantages of such embodiments are described below.

Further embodiments of the invention provide neuromorphic systems including artificial neuron apparatus according to any of the above embodiments, and an input signal generator for generating a neuron input signal.

Embodiments of the invention will be described in more detail below, by way of illustrative and non-limiting example, with reference to the accompanying drawings.

DETAILED DESCRIPTION

The embodiments to be described provide artificial neuron apparatus based on resistive memory cells. In examples below, the resistive memory cell is a PCM cell. The variable-resistance properties of PCM cells arise from heating a volume of chalcogenide material between the cell electrodes so as to change the relative proportions of a (high-resistance) amorphous phase and a (low-resistance) crystalline phase in the chalcogenide volume. If a voltage less than a certain threshold switching voltage is applied to the cell via the electrodes, the current will be so small that there will be very little Joule heating and substantially no phase change in the cell volume. However, if a programming ("write") signal above the threshold voltage is applied, cell resistance drops to a very low value during the application of the pulse through the phenomenon of electronic threshold switching. This enables the flow of a large current which results in significant Joule heating and subsequent phase change. For a cell initially in the high-resistance state, application of a write pulse with a certain input power and duration, based on cell characteristics and circuit design, causes partial crystallization of the amorphous region, with a consequent reduction in cell resistance read after the application of the write pulse. The cells exhibit an accumulation property whereby, through application of many such pulses, resistance of the memory cell can be progressively reduced down to a very low value compared to the initial high-resistance state. This process is illustrated schematically in FIG. 2. The upper part of this figure shows successive states of a PCM cell on application of a series of write pulses. The cell shown here is of the "mushroom cell" type, having a chalcogenide material such as GST (Germanium-Antimony-Tellurium) disposed between a first, "top" electrode and a second, "bottom" electrode. The smaller, bottom electrode serves as a heater for heating a dome of amorphous chalcogenide within the otherwise crystalline material. The lower part of the figure indicates how cell-resistance varies with number of write pulses. Resistance is initially high due to presence of the high-resistance amorphous dome between the electrodes. Successive write pulses cause partial crystallization of the amorphous volume, whereby cell-resistance is progressively reduced. Progressive crystallization ultimately leads to almost complete crystallization of the amorphous material or at least the formation of a crystalline "percolation path" through the amorphous material. Formation of this conductive pathway causes switching of the cell to the low-resistance state. The cell can be reset to its initial high-resistance state by an application of a pulse of sufficient power to melt the chalcogenide material adjacent the bottom electrode. The high-resistance amorphous dome is then restored on cooling.

Figure 3:
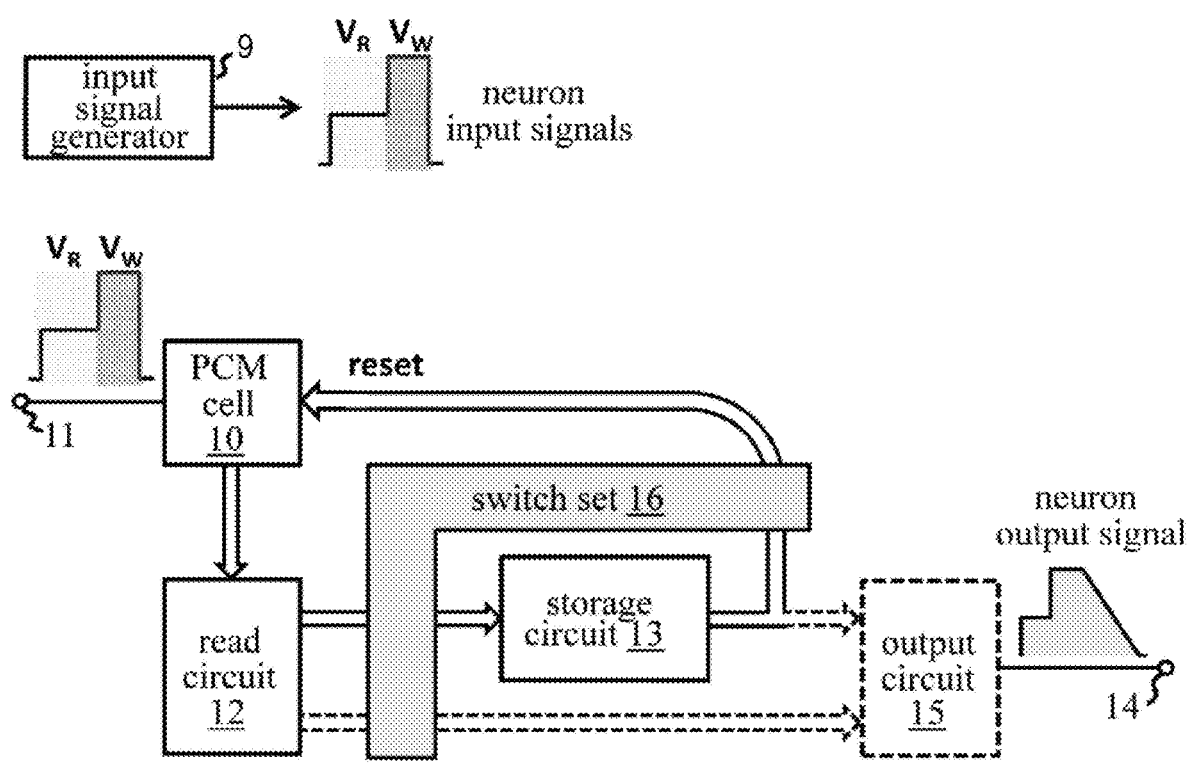
FIG. 3 is a generalized schematic of artificial neuron apparatus embodying the invention.

FIG. 3 is a generalized conceptual diagram indicating basic components of embodiments below. The neuron apparatus includes a PCM cell 10 connected in circuitry having an input terminal 11 for applying neuron input signals to the cell. The neuron input signals include a read portion and a write portion. In the example shown, the neuron input signals have a simple stepped shape with an initial read portion $V_R$, and a subsequent write portion $V_W$ (signal time increasing from left to right with the convention used herein). In general, however, the order and form of the read and write portions may vary in embodiments of the invention, and the input signal may include additional signal portions as discussed below. The read portion $V_R$ has an amplitude lower than that of the write portion $V_W$ and less than the threshold voltage required for phase-change.

Figure 1:
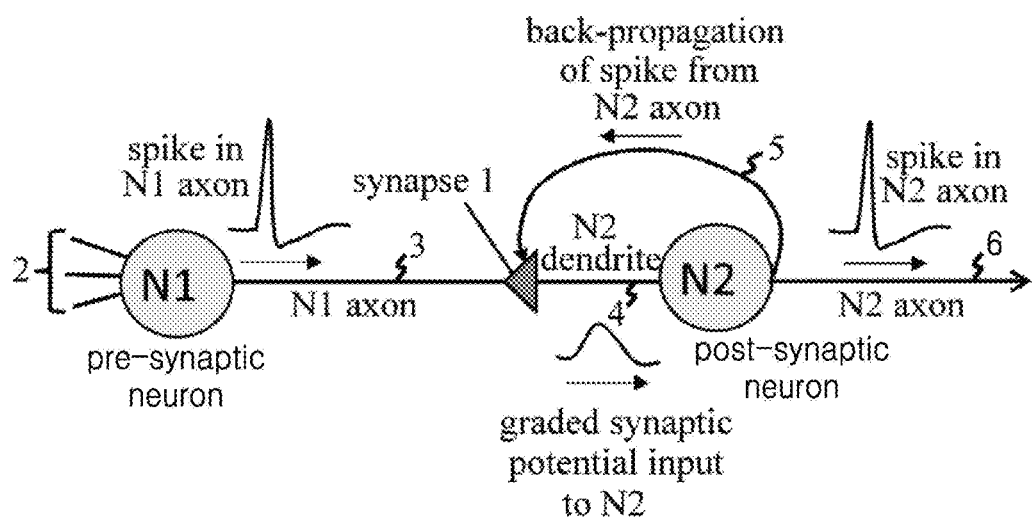
FIG. 1 is a schematic diagram of a biological neuron/synapse system.

The neuron input signals are produced by one or more input signal generators 9 of the neuromorphic system in which the neuron is connected. Referring back to FIG. 1, an input signal generator 9 may, for instance, include a synapse circuit for conveying inputs to a dendrite of the neuron from another neuron in the system. The input signal generator 9 may alternatively include a circuit providing external neuron stimuli, e.g., a circuit emulating a sensory receptor, connected to another dendrite of the neuron.

Figure 2:
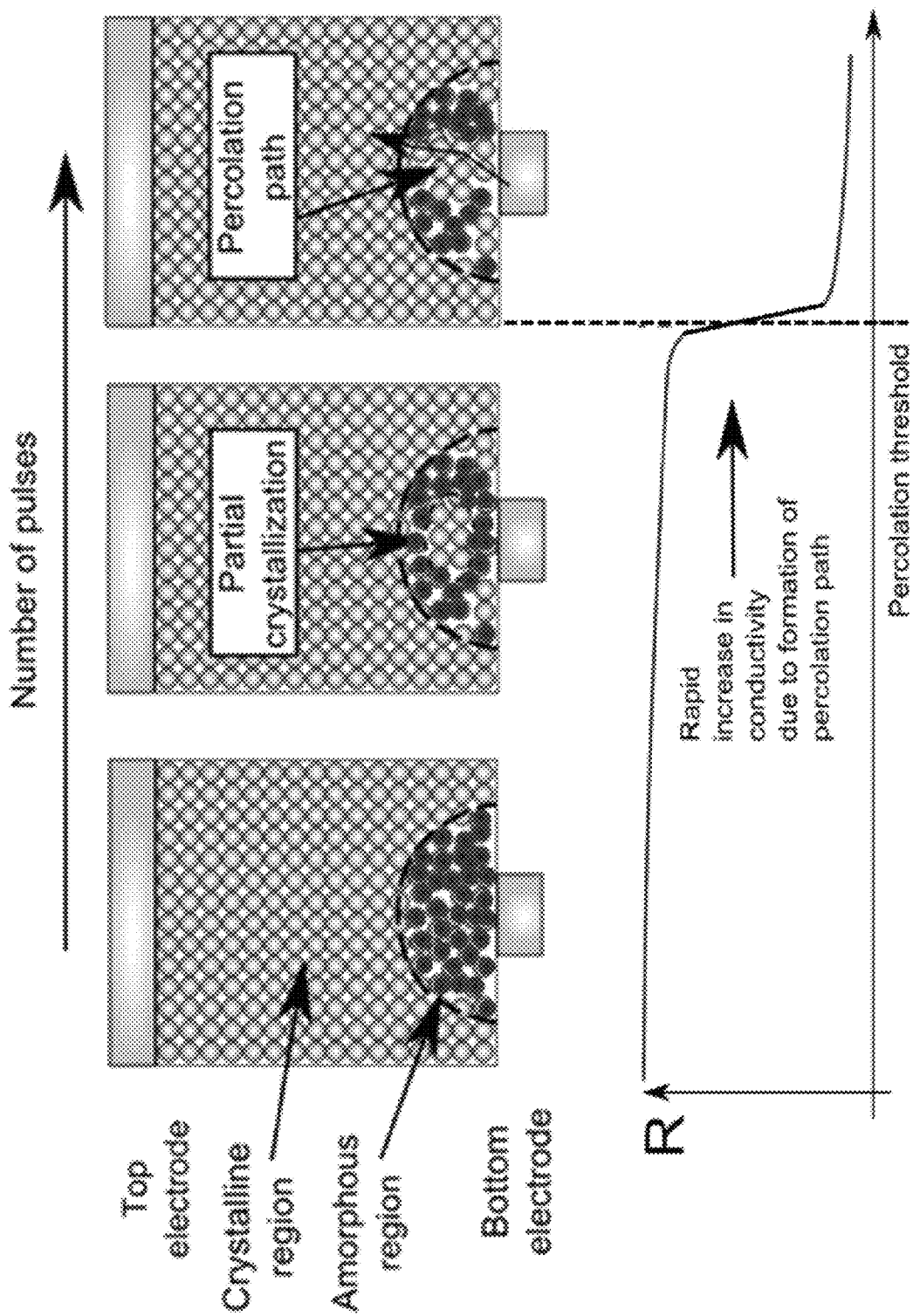
FIG. 2 is a schematic illustration of progressive crystallization in a phase-change memory cell.

The neuron circuitry includes a read circuit 12 for producing a read signal dependent on resistance of memory cell 10, and a storage circuit 13 for storing a measurement signal dependent on the read signal. An output terminal 14 provides a neuron output signal in operation of the apparatus. The output signal is dependent on the read signal in a first state, being one of a low-resistance state and a high-resistance state, of the memory cell. For the operation described below in which the cell-resistance progresses from a high-resistance to a low-resistance state as shown in FIG. 2, the output signal is dependent on the read signal in the low-resistance state. As indicated by the dashed lines in the figure, some embodiments may include an output circuit 15 for generating the neuron output signal on output terminal 14 in the first (here low-resistance) cell-state. Such an output circuit 15 may be responsive to the measurement signal from storage circuit 13 or the read signal from read circuit 12. In other embodiments, the output terminal 14 may be connected directly to the read circuit whereby the neuron output signal includes the read signal in the first (here low-resistance) cell-state.

The neuron circuitry also includes a switch set which is indicated schematically by shaded block 16. The switch set 16 is operable to supply the read signal from read circuit 12 to storage circuit 13 during application of the read portion $V_R$ of each neuron input signal to PCM cell 10. The switch set 16 is also operable, after application of the read portion $V_R$, to apply the measurement signal in the neuron apparatus to enable resetting of cell 10 from the first (here low-resistance) state to a second (here high-resistance) state. Switch set 16 may in general include one or more switches, and the number and arrangement of switches varies in different embodiments. In preferred embodiments to be described, the switch set includes two to four switches. The switches may be realized by transistors or diodes for example, and the neuron apparatus can be fabricated as an integrated nanoelectronic circuit using well-known material processing techniques.

The neuron apparatus is adapted such that resistance of the memory cell is progressively changed from the second state to the first state by application of the write portions of successive neuron input signals to the cell. In examples to follow, resistance of the memory cell 10 is progressively reduced, as described in relation to FIG. 2, by application of the write portions $V_W$ of successive neuron input signals. This can be achieved by appropriate selection of input signal levels, and design of the neuron circuitry, according to operating characteristics of PCM cell 10 as will be apparent to those skilled in the art.

As illustrated by examples below, component circuits indicated by blocks in FIG. 3 may or may not be wholly distinct. Elements may be shared by component circuits whereby functionality of one circuit may be included partially or wholly within another.

Figure 4:
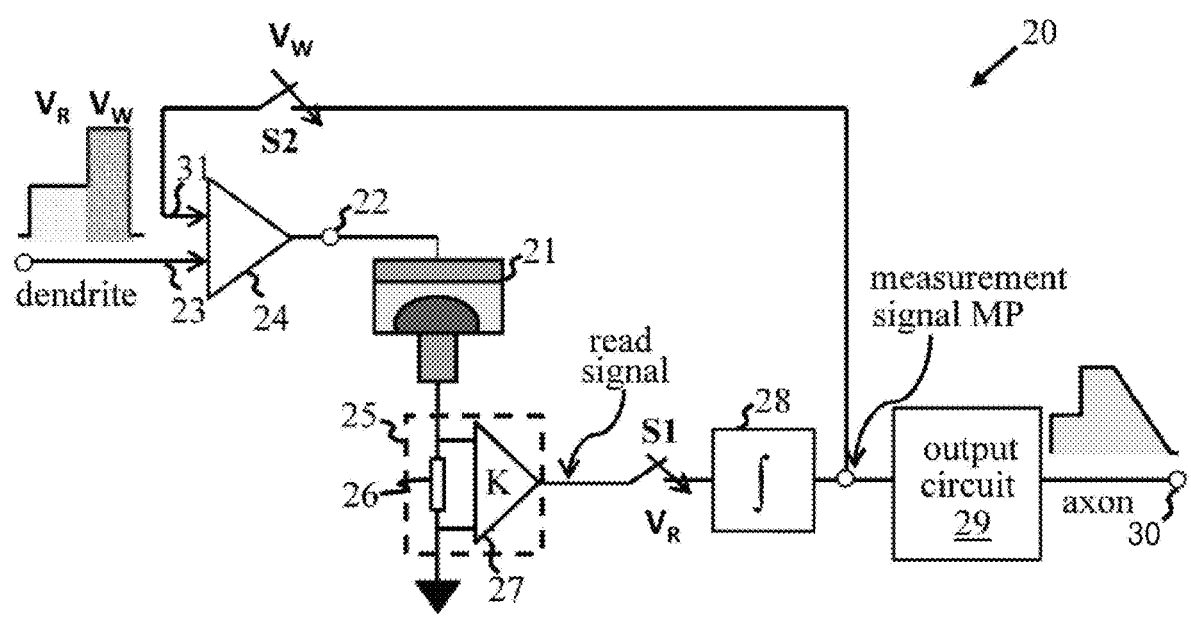
FIG. 4 is a block diagram of a first embodiment of the neuron.

FIG. 4 is a schematic block diagram showing structure of a first embodiment of the neuron apparatus. The apparatus 20 includes a PCM cell 21 having an input terminal 22 connected to the upper cell electrode. Neuron input signals are supplied to input terminal 22 from a dendrite 23 of the apparatus, here via an adder 24. In this example, multiple dendrite inputs may be connected to the adder 24 to provide connections from multiple neurons/external inputs of a neuromorphic system. In other embodiments, multiple dendrite inputs may be connected to a single input 23 of the adder. (External arbitration logic may be provided in the system to multiplex, or otherwise arbitrate, supply of neuron input signals to the input if desired to avoid coincidence of input signals from dendrites). The circuitry includes a read circuit indicated generally at 25. Read circuit 25 is illustrated here as including a read resistance 26 and a differential amplifier 27 connected across the read resistance 26. The read resistance 26 is connected between the PCM cell 21 and a reference terminal of the circuitry, here a signal earth. With this series arrangement of cell 21 and read resistance 26, the read signal can depend on voltage across the read resistance which varies inversely with cell resistance. Differential amplifier 27 amplifies this voltage, with a gain K, to provide the read signal in operation.

The switch set in this embodiment includes a first switch S1 and a second switch S2. Read circuit 25 is selectively connectable via first switch S1 to a storage circuit in the form of integrator circuit 28. The integrator circuit 28 is preferably a leaky integrator circuit as discussed below. When connected to read circuit via switch S1, the integrator 28 integrates the read signal and stores a measurement signal, or "measurement potential" MP, dependent on the read signal. An output circuit 29 receives the measurement signal MP and generates the neuron output signal at output terminal 30 in the low-resistance state of PCM cell 21. Through selective operation of the second switch S2, the measurement signal MP can also be supplied to cell input terminal 22, here via a further input 31 of adder 24.

The switches S1 and S2 in this embodiment are configurable in response to a neuron input signal. Switch S1 is operable in response to the read portion $V_R$ of each neuron input signal to supply the read signal to integrator 28 during application of that read portion to cell 21. Switch S2 is operable in response to the write portion $V_W$ of each neuron input signal to supply to the measurement signal MP to adder 24 during application of that write portion to the cell 21. The measurement signal MP is thus added to the write portion $V_W$ and the resultant combined signal is supplied to cell input terminal 22.

With the above arrangement, the measurement signal MP obtained during the read portion $V_R$ of a neuron input signal is supplied to cell 21 during application of the following write portion $V_W$. The measurement signal MP depends inversely on resistance of PCM cell 21, increasing as cell-resistance decreases. The circuitry is adapted such that, when the cell-resistance drops to the low-resistance state, the measurement signal MP is sufficiently large to effect resetting of the cell to its high-resistance state. The measurement signal MP in the low-resistance state also triggers output circuit 29 to provide the neuron output signal (spike) to output terminal 30.

Figure 5:
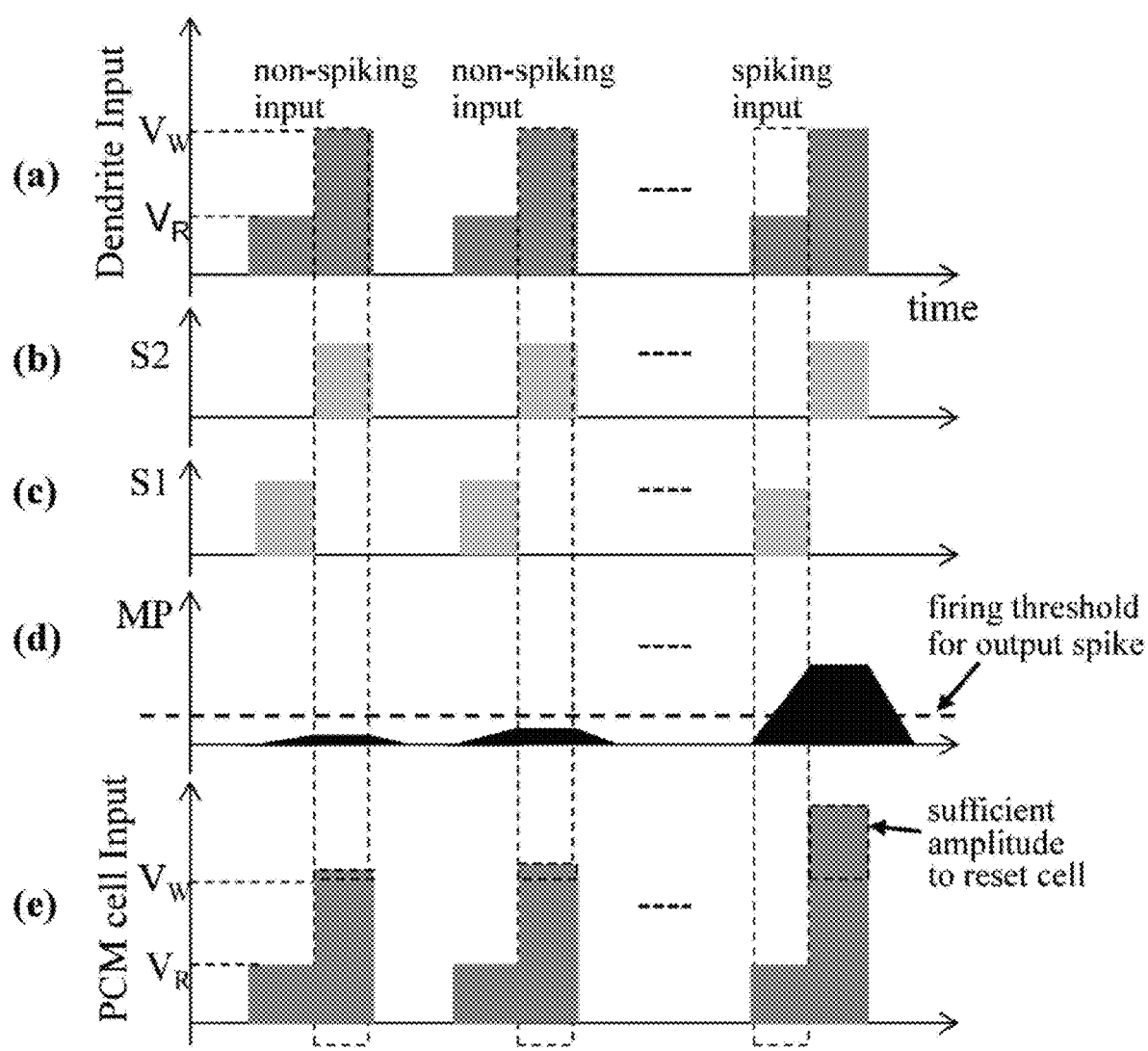
FIG. 5 is a schematic timing diagram illustrating operation of the FIG. 4 neuron.

Operation of the neuron is illustrated by the signal timing diagram of FIG. 5. The top section (a) of this diagram illustrates a series of neuron input signals applied to dendrite input 23. The shaded regions in sections (b) and (c) indicate closure timings for switches S2 and S1 corresponding to write and read portions $V_W$ and $V_R$ respectively of the input signals. Section (d) indicates the measurement signal MP and section (e) indicates the resulting cell input at terminal 22. The measurement signal MP is accumulated during read portions $V_R$. The resulting signal is stored by integrator 28 and added to the following write portion at cell input 22. The stored measurement signal MP progressively increases with successive input signals as the cell-resistance is progressively reduced. The leakiness of integrator 28 allows the stored signal MP to leak away with time. The time constant of integrator 28 can be set such that the stored signal dissipates between successive input signals. Since the read portion $V_R$ precedes the write portion $V_W$ in this preferred embodiment, the measurement signal MP need only be stored substantially for the duration of the immediately-following write portion $V_W$. After sufficient input signals have been applied to the cell, the next input signal (the "spiking input" on the right of the figure) will cause switching of cell 21 to the low-resistance state. The measurement signal MP will then exceed a firing threshold set in output circuit 29, triggering generation of the output spike at terminal 30. When this measurement signal MP is added to the cell input as indicated in section (e), the amplitude of the cell input signal is sufficient to reset the cell to its high-resistance state.

It will be seen that the switch set in the above embodiment serves to decouple the cell-read and -write operations. Storage circuit 28 enables the stored measurement signal MP to be applied via the switch set to effect resetting of the cell after a read operation, providing an effective cell reset mechanism with distinct read and reset phases in operation of the neuron.

Figure 6:
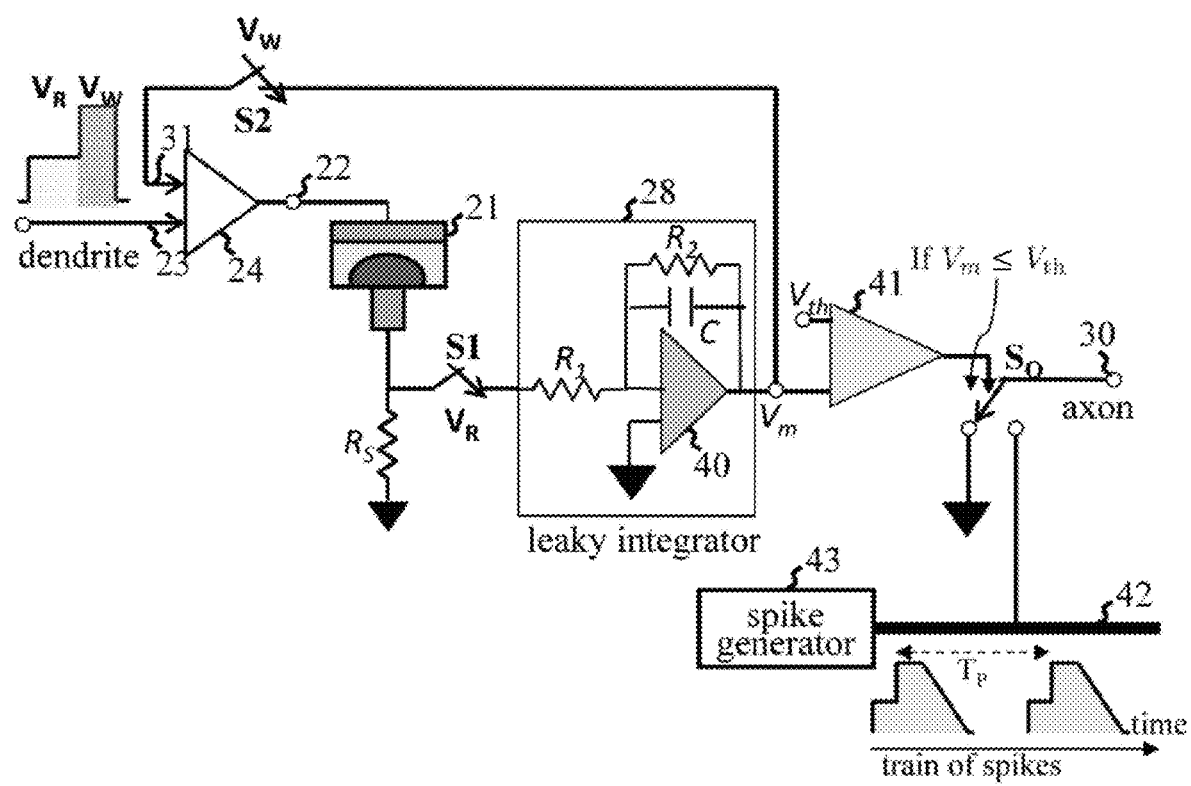
FIGS. 6 and 7 show different embodiments of the neuron apparatus.

FIG. 6 shows an exemplary implementation of a neuron corresponding generally to neuron 20 of FIG. 4. Corresponding components are indicated by like references in the figure. In the FIG. 6 circuitry, the read circuit simply includes a read resistance $R_S$ connected between cell 21 and the ground terminal. Leaky integrator 28 is implemented by an operational amplifier 40 connected to a capacitor C and resistors $R_1$ and $R_2$ as shown. Output circuit 29 includes a comparator 41 which compares the measurement signal MP, here voltage $V_m$ at the output of amplifier 40, with the firing threshold represented by voltage $V_{th}$ in the figure. An output switch $S_o$ is connected between comparator 41 and output terminal 30. Switch $S_o$ connects the output terminal to ground if $V_m$ $V_{th}$. When cell 21 switches to the low-resistance state, the measurement signal $V_m$ will exceed the firing threshold $V_{th}$. The comparator then generates a control signal which triggers switching of switch $S_o$ to connect the output terminal to a signal pathway 42 on which a periodic spike train is generated by a spike generator circuit 43. Spike generator circuit 43 can generate spikes with a desired spike shape for neuron output signals, and with a periodicity $T_p$. $T_p$ is chosen according to the leakage time of integrator 28 to ensure that at least one spike will be supplied to output terminal 30 while switch $S_o$ is closed. The signal pathway 42 in this arrangement can be shared between multiple neuron circuits in the neuromorphic system.

Figure 7:
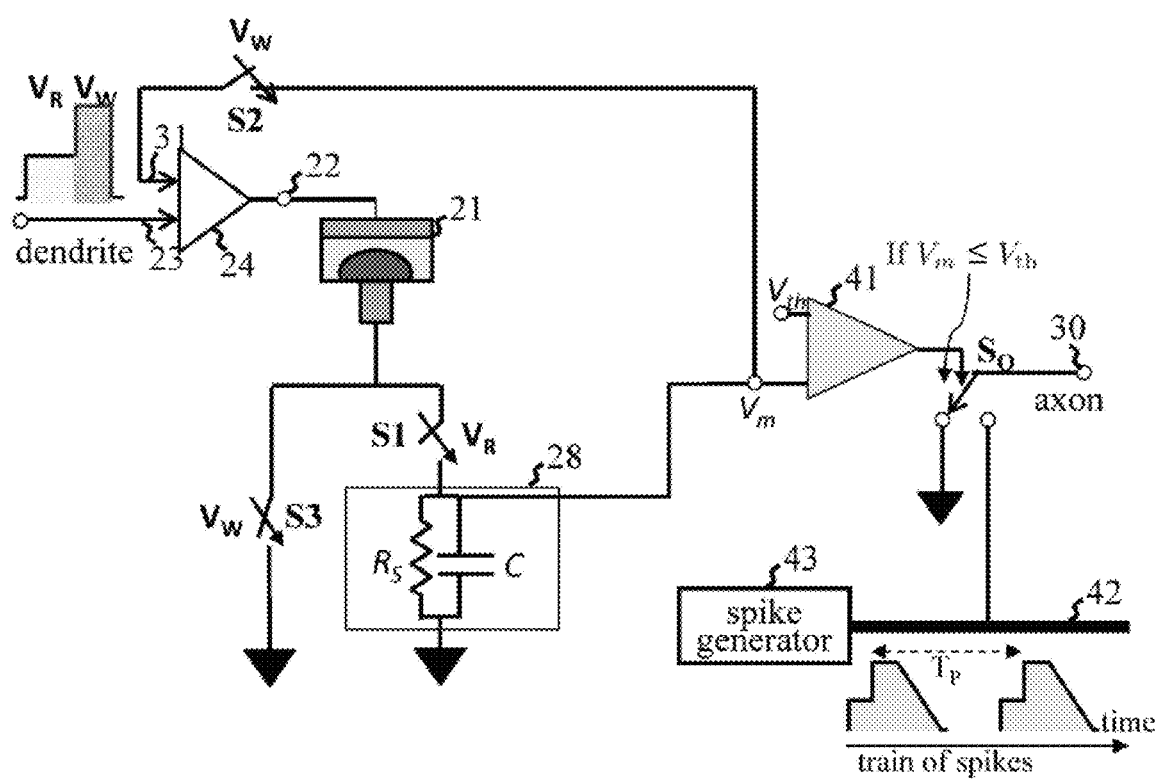

FIG. 7 shows another neuron implementation corresponding generally to neuron 20 of FIG. 4. Corresponding components are again indicated by like references. In this circuitry, the read circuit is provided by read resistance $R_S$ which, together with capacitor C, forms part of leaky integrator circuit 28. The read signal is thus supplied to integrator 28 when switch S1 closes as before. The switch set in this embodiment includes a third switch S3 which is operable in response to the write portion $V_W$ of each neuron input signal to ground cell 21 during the cell-write operation. This prevents the stored voltage $V_m$ across capacitor C from reducing the voltage dropped across cell 21 for the write operation. The output circuit in this embodiment is the same as that of FIG. 6.

The above embodiments provide efficient neuron realizations for connectivity and operation in a neural network configuration. These neurons can readily replace silicon neurons, with significant savings in complexity and silicon area. The neuron state is stored in a non-charge based manner, obviating the problem of undesirable charge leakage in silicon neurons. The inherent stochastic nature of PCM cell operation, as well as the positive feedback of accumulation, are also advantageous, having parallels in biological neurons and offering interesting ramifications for neuromorphic computation. Neurons embodying the invention offer the ability to fire in excess of $10^9$ times. The neuron circuits can also operate with input signals of different amplitudes and durations. For example, the amplitude and/or duration of the write-portion $V_W$ may depend on synaptic weight or on strength of external stimuli.

Figure 8:
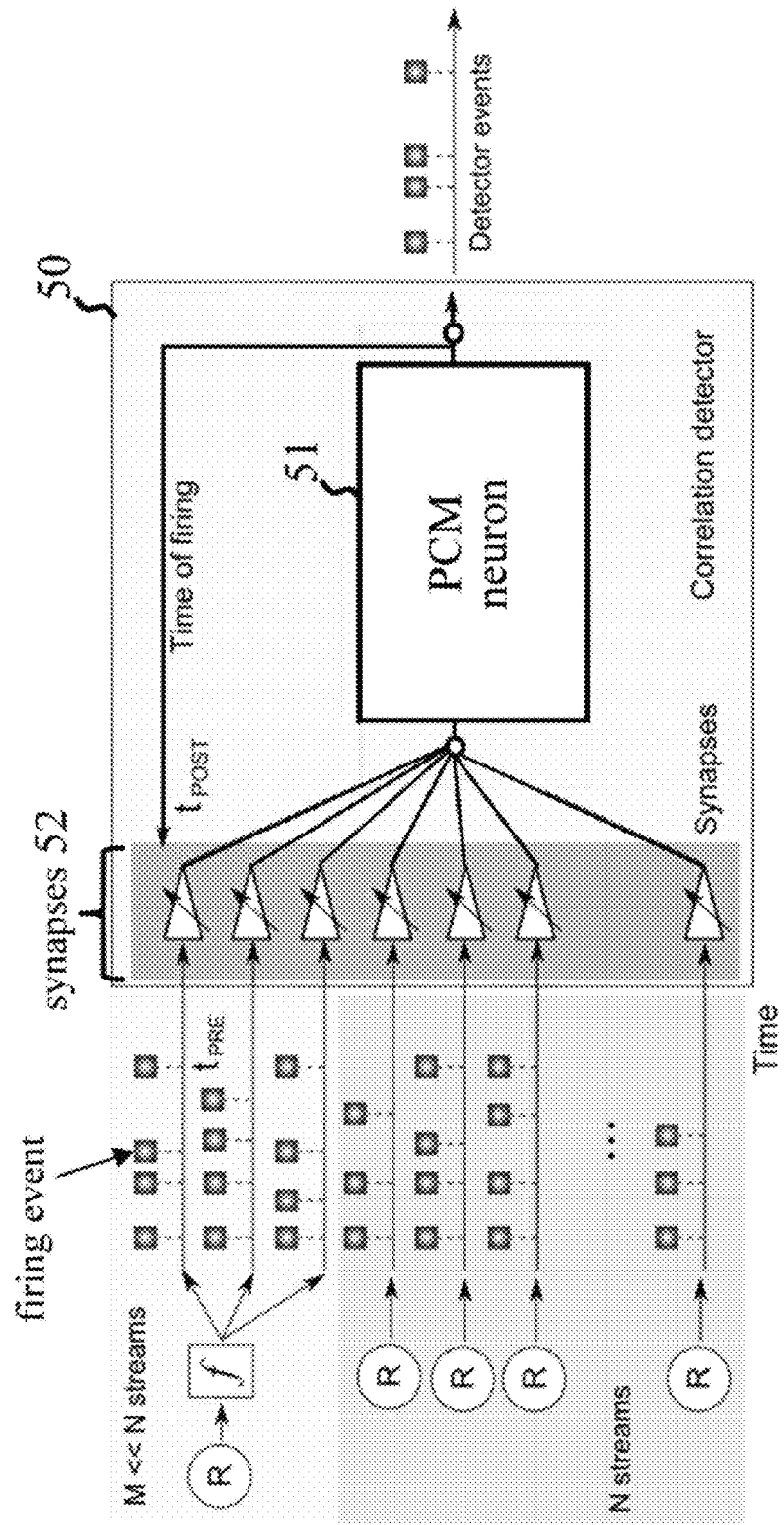
FIG. 8 indicates structure of a simulation model for simulating operation of the FIG. 4 neuron in a neural network configuration.

Effectiveness of the neuron apparatus in a network configuration is demonstrated by simulating neuron operation in a correlation detection application. The basic arrangement of the system employed here is illustrated in FIG. 8. A correlation detector 50 includes a PCM-based neuron 51 as described with reference to FIG. 4. The neuron input terminal receives signals from multiple synapses 52 via respective dendrite inputs. Each synapse receives a stream of firing events (corresponding to spikes from a pre-synaptic neuron) at timings denoted by "$t_{PRE}$". The lower N streams of synaptic input events in the figure are triggered by uncorrelated random functions R. The upper M<<N input streams are correlated, being triggered by a function $f$ of a common random function R. The synapses weight their inputs and provide weighted input signals (with amplitude $V_W$ and/or duration dependent on weight) to neuron 51. Neuron 51 accumulates the inputs and provides output spikes, as described above, at timings denoted by "$t_{POST}$". The synapses change their weight dynamically depending on relative timings $t_{PRE}$-$t_{POST}$ for the pre- and post-neuron spike events. Various known weight-change functions could be used to emulate the synaptic plasticity here. In this example, a spike-timing dependent plasticity function is employed in which synaptic weight is incrementally increased if pre- and post-synaptic events are ordered causally (the presynaptic event precedes the postsynaptic event), and synaptic weight is incrementally decreased when the events are order anti-causally.

Figure 9:
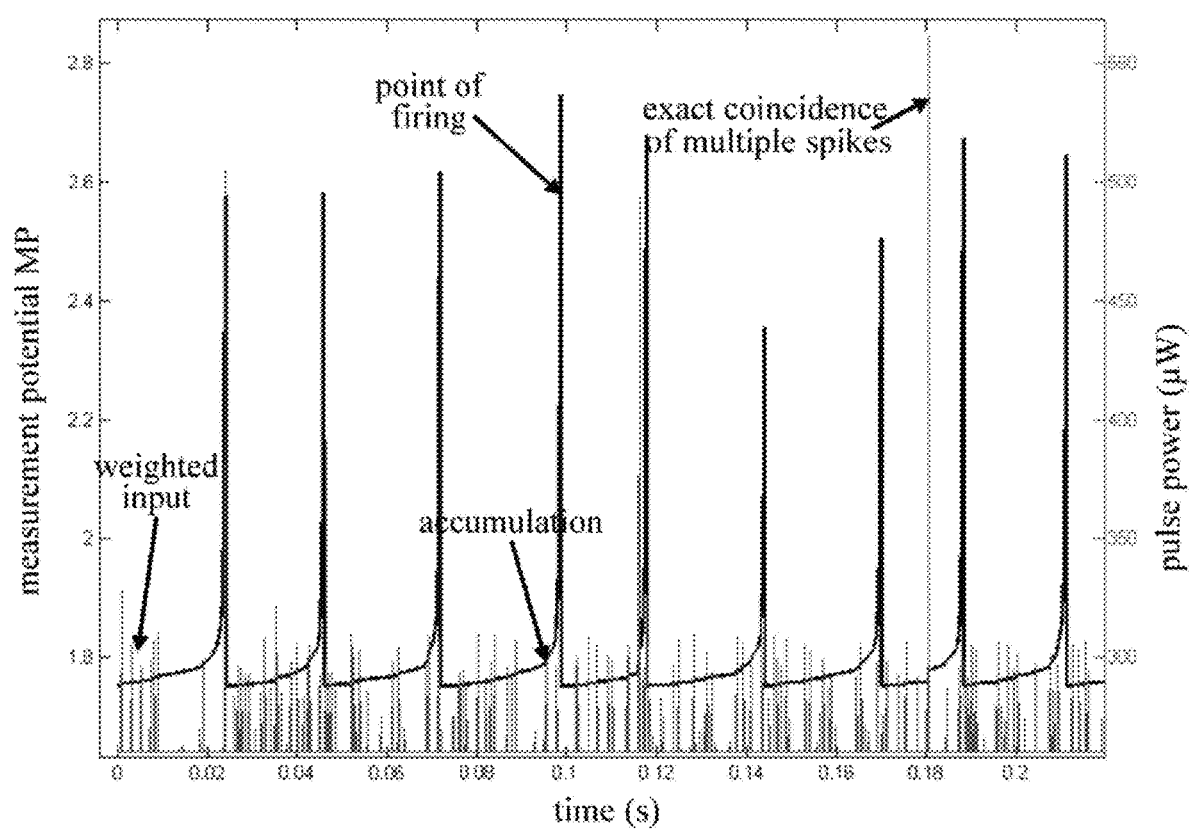
FIGS. 9 and 10 illustrate operating results for the FIG. 8 model.
Figure 10:
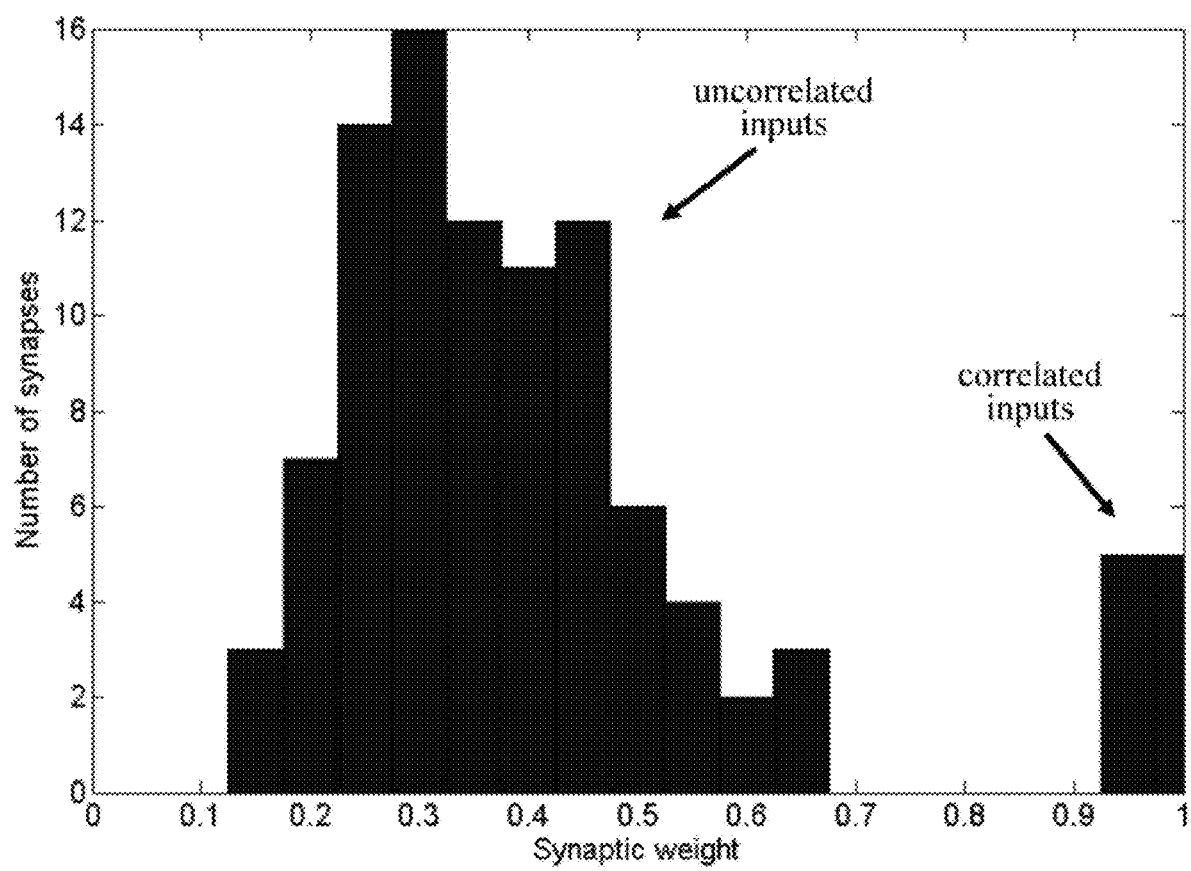

FIGS. 9 and 10 demonstrate results obtained with the FIG. 8 system. The light trace in FIG. 9 indicates pulse power for the weighted input signals to neuron 51 from the various synapses 52. The dark trace indicates the measurement potential MP in neuron 51. This shows repetitive phases corresponding to accumulation in the PCM cell followed by spikes at the point of firing. FIG. 10 illustrates the resulting distribution of synaptic weights in synapses 52 following an operating period of about 500 seconds. It can be seen that the weights of synapses with correlated inputs have converged, whereas synapses with uncorrelated inputs have widely distributed weights. The FIG. 8 system thus operates effectively as a correlation detector.

Figure 11:
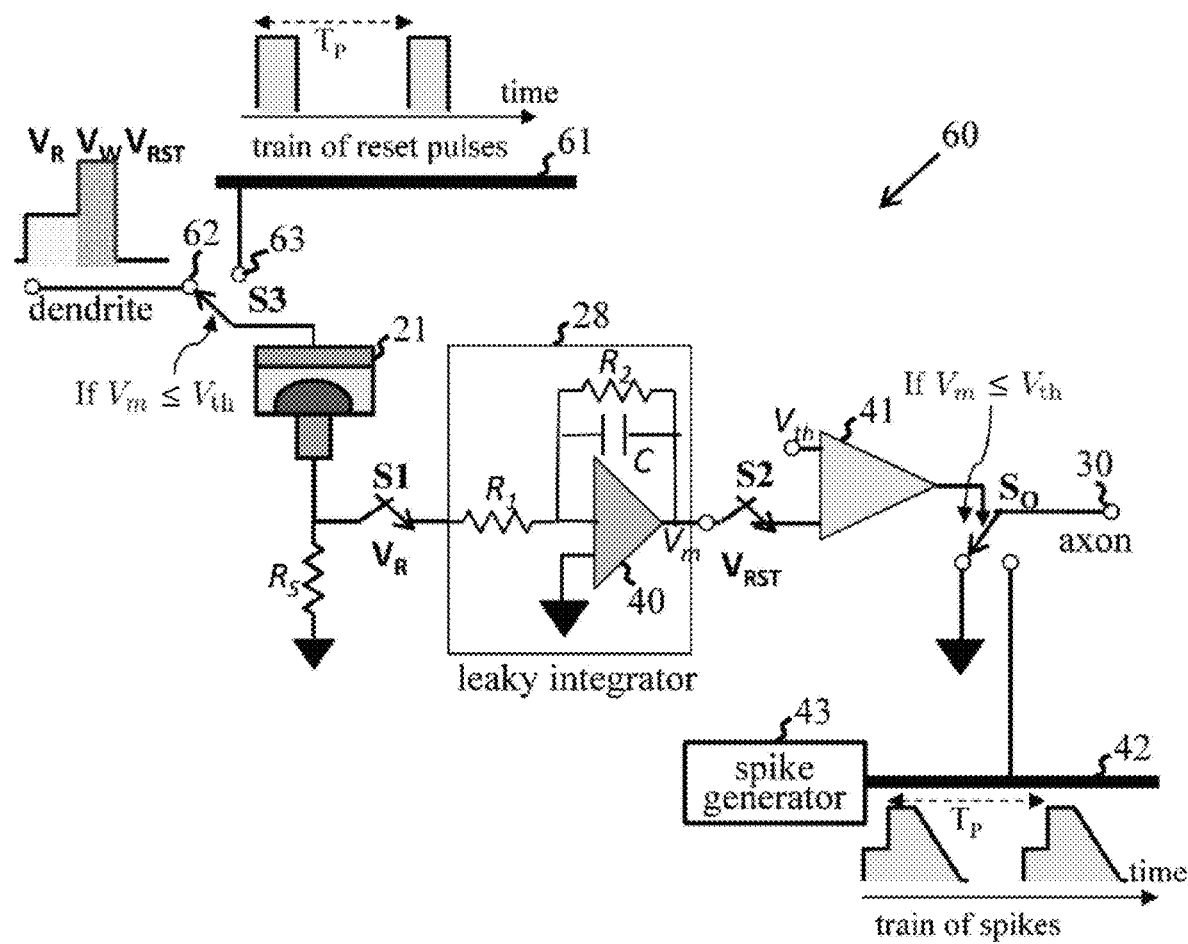
FIG. 11 show another neuron apparatus embodying the invention.

Various other embodiments of the neuron circuitry can be envisaged. In some embodiments, adder 24 could be omitted and the measurement signal MP may be applied directly to the cell input terminal to enable cell-reset in the low-resistance state. Also, embodiments might be envisaged where the measurement signal does not leak away between neuron input signals and/or another mechanism is employed in the circuitry to reset the value of MP between input signals. The stored measurement signal MP can also be applied in various ways to trigger reset of the cell. FIG. 11 shows an alternative neuron apparatus 60 in which the neuron input signal includes a reset portion after the read portion thereof. This is indicated in FIG. 11 by signal portion $V_{RST}$ (which may be a zero-volt signal level) following the write portion $V_W$. Reset portion $V_{RST}$ defines a time period for application to the PCM cell of an externally-generated reset pulse from a periodic train of reset pulses generated on a signal pathway 61. Reset pulses with a desired shape can be generated by a reset signal generator (not shown) of a neuromorphic system, and pathway 61 can be shared between multiple neuron circuits in the system.

The FIG. 11 circuitry includes various components corresponding to those of FIG. 6. These components are indicated by like references in FIG. 11. Here, however, the circuitry has first and second input terminals. The first input terminal 62 receives neuron input signals to be applied to the cell. The second input terminal 63 is connected to signal pathway 61. The switch set in this embodiment includes three switches. The first switch S1 is operable, as in FIG. 6, to supply the read signal to the storage circuit 28 during application of the read portion $V_R$ of the neuron input signal to cell 21. The second switch S2 is operable, in response to the reset portion $V_{RST}$ of a neuron input signal, to supply the measurement signal $V_m$ to the output circuit during application of that reset portion to the cell. The third switch S3 is operable in response to the control signal generated by comparator 41 when $V_m > V_{th}$, i.e., when the cell switches to the low-resistance state. Switch S3 normally connects the first input terminal 62 to the cell 21. In response to the control signal from comparator 41, the switch S3 switches to connect the second input terminal 63 to the cell. In this state, a reset pulse from signal pathway 61 is applied to the cell. The cell is thus reset to its high-resistance state during the reset portion $V_{RST}$ of the input signal which triggers an output spike.

Figure 12:
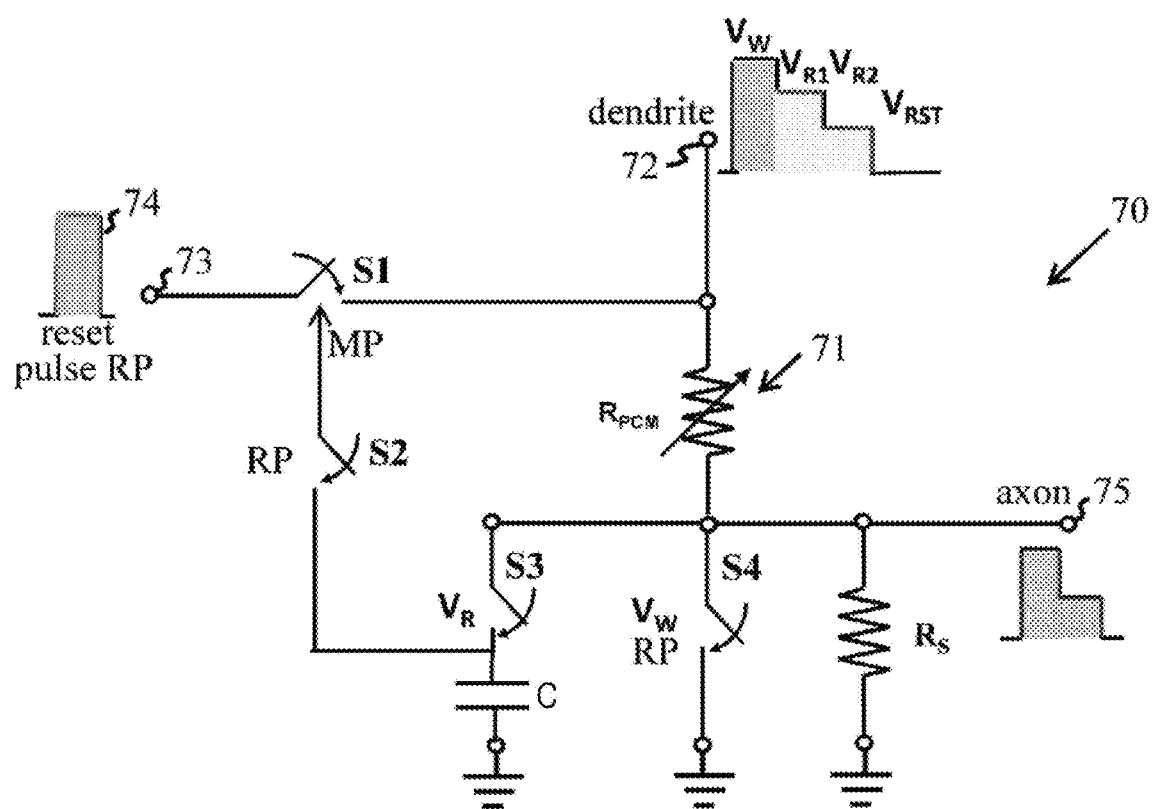
FIG. 12 shows a further neuron apparatus embodying the invention.

FIG. 12 shows another neuron apparatus 70 embodying the invention. In this embodiment, the neuron 70 includes a PCM cell 71 represented by variable resistance $R_{PCM}$. The PCM cell 71 is connected in circuitry having first and second input terminals 72 and 73. The first input terminal 72 receives neuron input signals to be applied to the cell. (The neuron input signals can be generated as before by one or more input signal generators (not shown) of the system, and input signals from multiple such generators may be added, multiplexed or otherwise arbitrated for supply to the first input terminal 72 as previously described.) The second input terminal 73 receives a reset signal, indicated by reset pulse 74, for resetting the cell from the low-resistance state to the high-resistance state. As in the FIG. 11 embodiment, the reset pulse 74 may be generated by a reset signal generator (not shown) of the system which generates a periodic train of reset pulses on a (preferably shared) signal pathway which is connected to the second input terminal 73.

The neuron input signal in this embodiment again includes a reset portion $V_{RST}$ after the read portion $V_R$ thereof. This is indicated by signal portion $V_{RST}$ (which may be a zero-volt signal level as before) which defines a time period for application to PCM cell 71 of a reset pulse RP. (The periodicity of the reset pulse train in this embodiment is determined so that at least one reset pulse RP is supplied to the second input terminal 73 during the reset portion $V_{RST}$ of a neuron input signal.) The read portion $V_R$ of the neuron input signal here includes first and second segments $V_{R1}$ and $V_{R2}$. Second segment $V_{R2}$, which follows first segment $V_{R1}$, has a lower signal level than the first segment $V_{R1}$.

The read circuit in this embodiment again includes a read resistance $R_S$ connected between cell 71 and the ground terminal. The storage circuit here includes a capacitor C which is selectively connectable across read resistance $R_S$ as discussed below. The neuron output terminal 75 is connected to the read resistance $R_S$ whereby the neuron output signal of this embodiment includes the read signal in the low-resistance cell-state as explained below.

The switch set in this circuitry includes two switches S1 and S2 which enable the cell-reset operation. The first switch S1 is operable, in response to the measurement signal MP stored by capacitor C in the low-resistance cell-state, to connect the second input terminal 73 to cell 71. The second switch S2 is operable, in response to application of a reset pulse RP at second input terminal 73, to apply the measurement signal MP to the first switch S1. In this example, the switch set includes two further switches S3 and S4. The third switch S3 is operable, in response to the read portion $V_R$ of a neuron input signal, to connect capacitor C across read resistance $R_S$ and thus to supply the read signal to the capacitor C during application of the read portion $V_R$ to cell 71. The fourth switch S4 is connected between cell 71 and the ground terminal. This switch S4 is operable, in response to each of the reset pulse RP and the write portion $V_W$ of each neuron input signal, to short the read resistance R. This prevents generation of an output signal at terminal 75 during the write and reset phases of circuit operation.

Figure 13A:
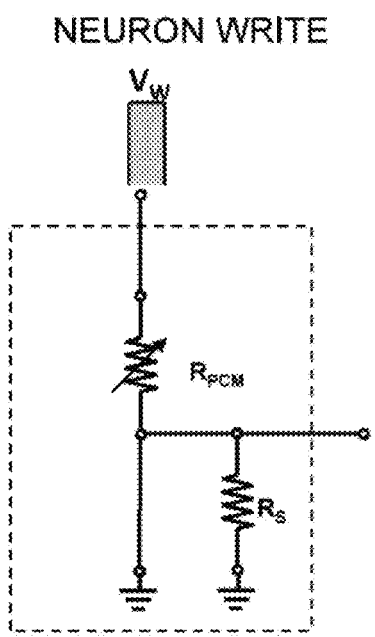
FIGS. 13A through 13C indicate different stages in operation of the FIG. 12 neuron.
Figure 13B:
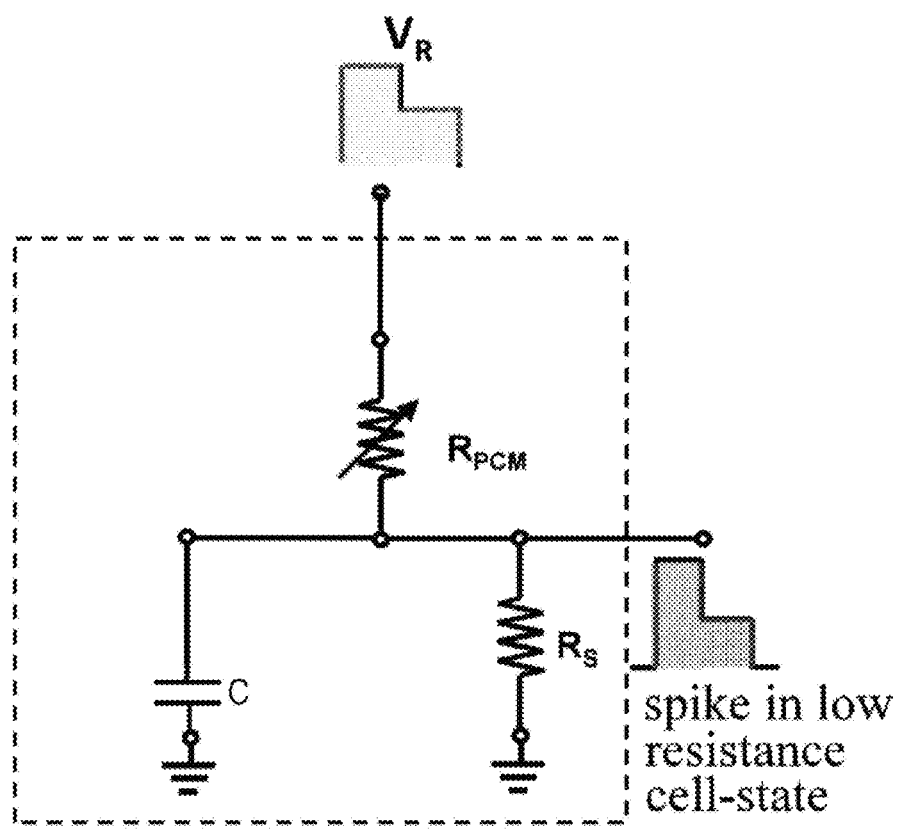
Figure 13C:
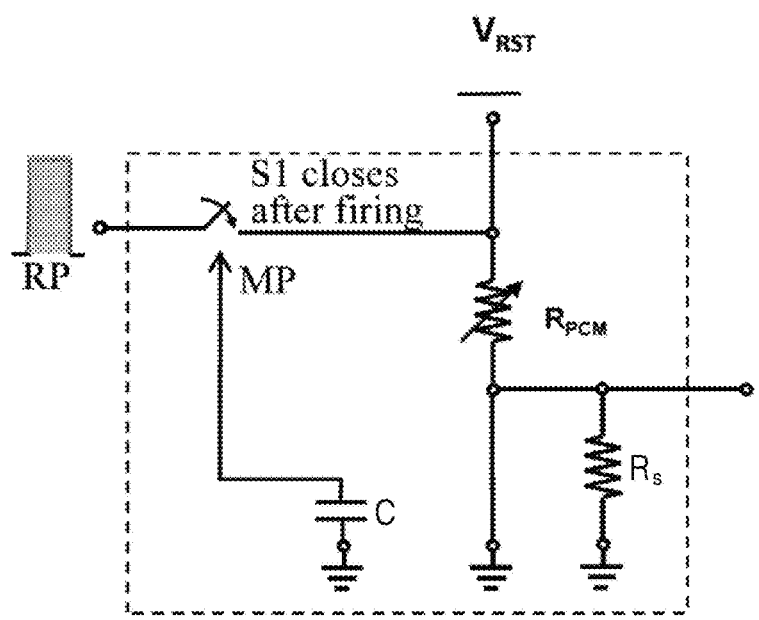

FIGS. 13A through 13C indicate operation of neuron 70 in the write, read and reset phases respectively. In the write phase, the circuit is configured by the switch set as shown in FIG. 13A. Cell-resistance is progressively reduced by application of the write portions $V_W$ of successive neuron input signals as described above. In the read phase, the circuit is configured as shown in FIG. 13B. Since cell-resistance is high before the "firing" state, only negligible current flows through read resistance $R_S$ giving negligible output at terminal 75. However, when the cell switches to the low-resistance state, a large current flows through R. The two-step read portion $V_{R1}$, $V_{R2}$ then produces a corresponding two-step spike shape at output terminal 75. This provides an appropriate output spike shape without requiring a specific output circuit to achieve this. The read signal in the low resistance state is also supplied to capacitor C which stores the measurement signal MP for use in the subsequent reset phase. FIG. 13C shows the circuit configuration in this phase. Before the cell has switched to the low-resistance state, the measurement signal MP is insufficient to close switch S1, so no reset signal is applied to the cell. After switching to the low-resistance state, however, the resulting measurement signal MP is sufficient to close switch S1 in the reset phase. A reset pulse is then applied to the cell to restore the initial high-resistance cell-state.

The above embodiment provides the neuron functionality of earlier embodiments in a simple circuit design which is especially suited to the needs of combined synapse-neuron array with uniform elements. In particular, the circuit design is closely aligned to that of a PCM-based synapse disclosed in our co-pending UK Patent Application No. 1419355.1 filed on Oct. 30, 2014. The structure and operation of this synapse is described briefly below.

Figure 14:
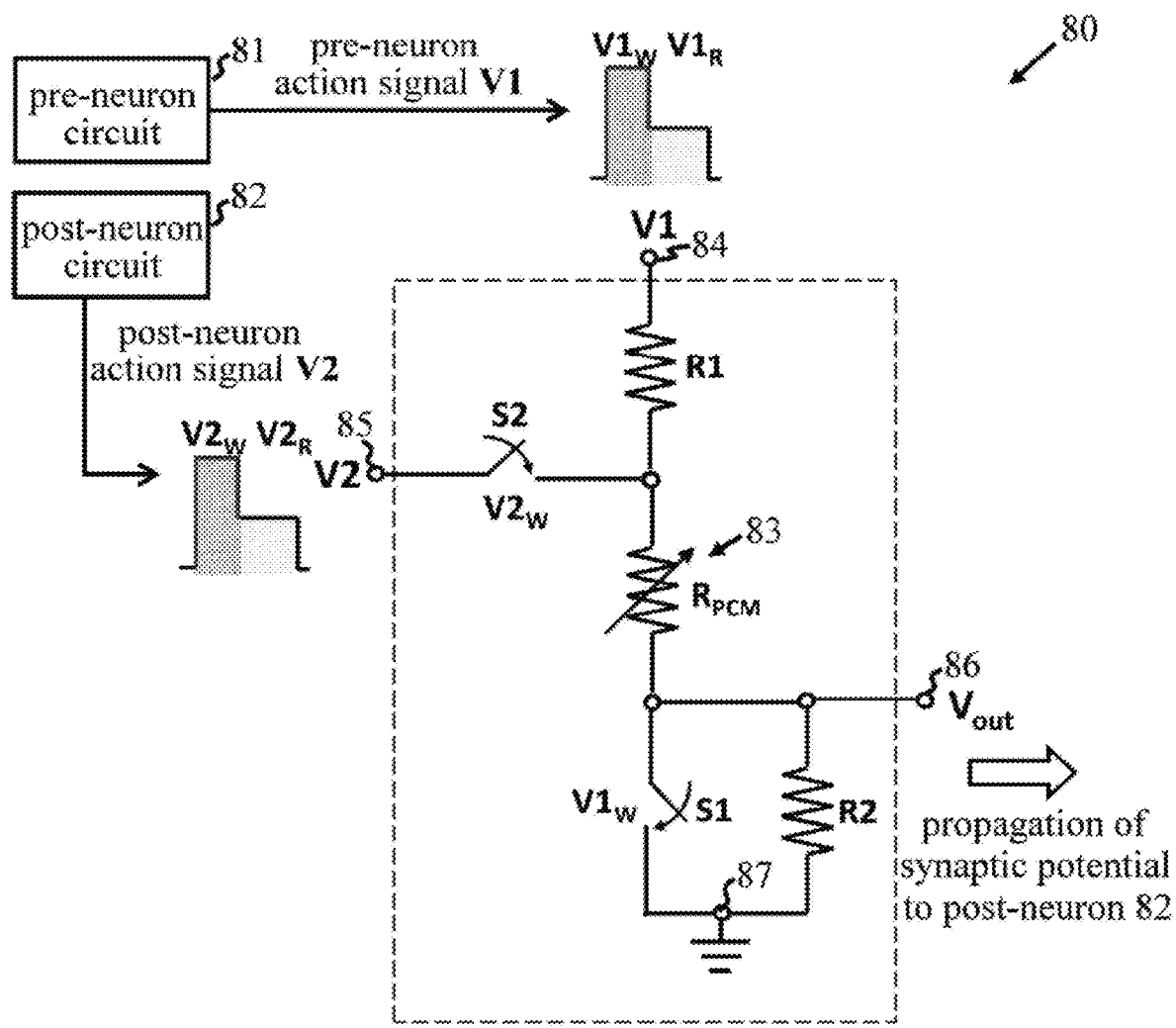
FIG. 14 shows a neuromorphic synapse apparatus with similar structure to the neuron of FIG. 12.

FIG. 14 shows a schematic circuit diagram for a neuromorphic system includes a synapse, indicated generally at 80, connected between a pre-neuron circuit 81 and a post-neuron circuit 82. The synapse 80 includes a resistive memory cell, here a PCM cell 83, which is represented by variable resistance $R_{PCM}$. The PCM cell 83 is connected in circuitry having a first input terminal 84 for receiving a pre-neuron action signal (spike) V1 from pre-neuron circuit 81. The circuitry also has a second input terminal 85 for receiving a post-neuron action signal V2 from post-neuron circuit 82. The circuitry has an output terminal 86 at which a synaptic output signal, dependent on resistance of PCM cell 83, is provided in operation. The synapse circuitry further includes a switch set, including a first switch S1 and a second switch S2, and first and second resistances represented by resistors R1 and R2. The first resistor R1 is connected between the first input terminal 84 and the upper electrode of PCM cell 83. The second resistor R2 is connected between the lower electrode of cell 83 and a reference terminal 87, here a signal earth. The output terminal 86 is also connected to the lower electrode of PCM cell 83. The first switch S1 is connected between cell 83 and reference terminal 87 in parallel to the second resistor R2. The second switch S2 is connected between the second input terminal 85 and the PCM cell 83.

The spikes V1 and V2 generated by neuron circuits 12, 13 each have a stepped shape with a write portion $V1_W$, $V2_W$ and a read portion $V1_R$, $V2_R$. The state of switches S1 and S2 is configurable in dependence on at least one of the action signals V1 and V2. In the embodiment shown, the write portions $V1_W$, $V2_W$ provide control signals for the switches as indicated in the figure. The first switch S1 is closed during the write portion $V1_W$ of the pre-neuron action signal V1. The second switch S2 is closed during the write portion $V2_W$ of the post-neuron action signal V2. Depending on the switch configuration, the synapse circuitry can selectively effect (a) application to PCM cell 83 of a programming (write) signal for programming resistance of the cell, and (b) application to the cell of a read signal which produces the synaptic output signal at output terminal 86. More particularly, through operation of the control signals on switches S1, S2 in the circuit arrangement shown, the synapse circuitry is operable such that: (a) the synaptic output signal is provided at output terminal 86 in response to application at the first input terminal 84 of the read portion $V1_R$ of the pre-neuron action signal V1; and (b) a programming signal is applied to the cell in response to simultaneous application of the write portions $V1_W$, $V2_W$ of the pre- and post-neuron action signals at the first and second input terminals 84 and 85, respectively.

Figure 15A:
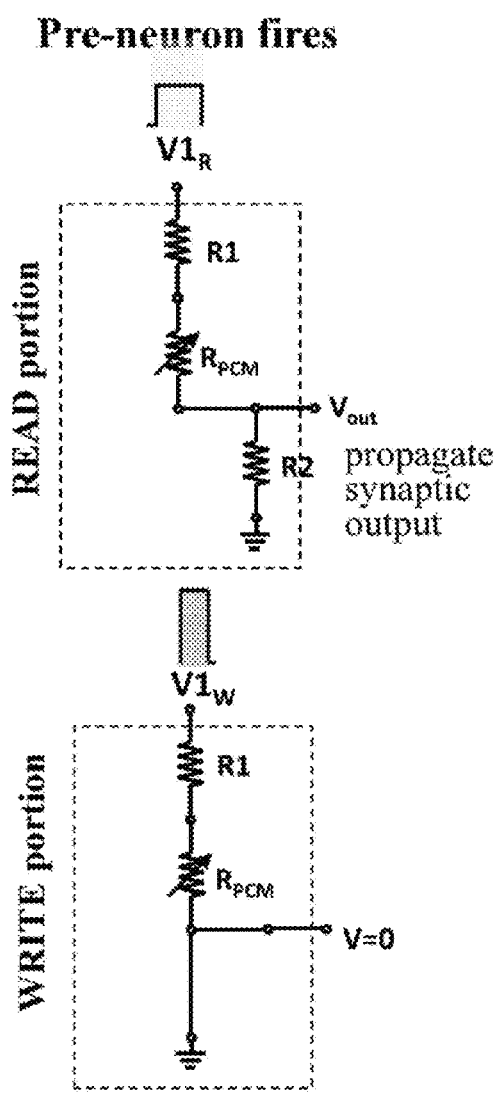
FIGS. 15A through 15C indicate different stages in operation of the FIG. 14 synapse.

FIGS. 15A though 15C indicate operation of the synapse 80 in different neuronal firing scenarios. FIG. 15A shows the circuit configuration when only the pre-neuron circuit 81 fires. The upper portion of this figure shows the configuration on application of the read portion $V1_R$ of action signal V1 at the input terminal 84. Both S1 and S2 are open, and $V1_R$ at terminal 84 effects a read mode of operation in which a read voltage is dropped across cell 83. Due to the low amplitude of read portion $V1_R$, this read voltage is sufficiently low that no change in cell-resistance can occur. The resulting current flowing through the cell produces a synaptic output signal $V_{out}$ which is dependent on the cell resistance $R_{PCM}$. This output signal $V_{out}$ represents the graded synaptic potential which is propagated on to the post-neuron circuit 82. An input signal generator (not shown) of the system can be used to generate a desired pulse shape for the neuron input signal as required.

The lower portion of FIG. 15A shows the configuration on application of the write portion $V1_W$ of action signal V1 at the input terminal 84. S2 is open but S1 is closed, shorting resistance R2. The voltage to output terminal 86 is thus 0 V, and there is no propagation of synaptic potential to post-neuron circuit 82. Resistance R1 is selected such that the cell current is insufficient to change cell-resistance. Hence, there is no modification of synaptic strength due to firing of pre-neuron circuit 81 alone.

Figure 15B:
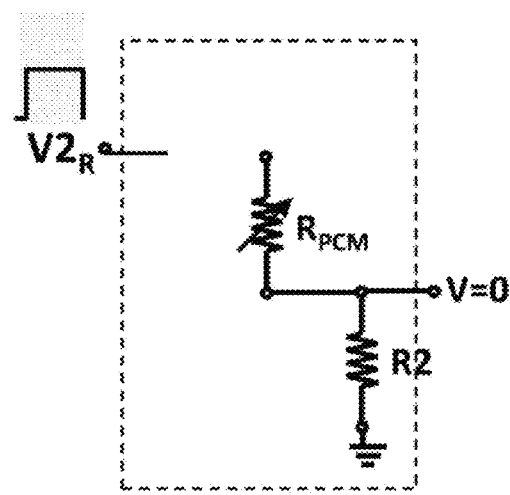
Figure 15B:
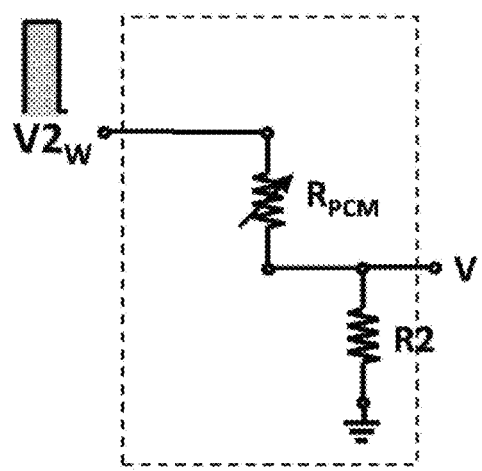

FIG. 15B shows the circuit configuration when only the post-neuron circuit 82 fires. The upper portion of this figure shows the configuration on application of the read portion $V2_R$ of action signal V2 at the input terminal 85. Both S1 and S2 are open, whereby no current flows in the circuit and the voltage at output terminal 86 is 0 V. The lower portion of this figure shows the configuration on application of the write portion $V2_W$ of action signal V2 at input terminal 85. S1 is open and S2 is closed. Resistance R2 is selected such that this resulting cell current is insufficient to change cell-resistance. Hence, there is no modification of synaptic strength due to firing of post-neuron circuit 82 alone. The system can be adapted such that the voltage V at output terminal 86 in this scenario does not propagate to post-neuron circuit 82. For example, post-neuron circuit 82, or the neuron input signal generator, may be adapted to disable its input from synapse 80 during the write portion $V2_W$. Alternatively, for example, the switch S2 could be driven closed by the write portion $V1_W$ of the pre-neuron action signal V1 instead of the write portion $V2_W$ of the post-neuron action signal V2.

Figure 15C:
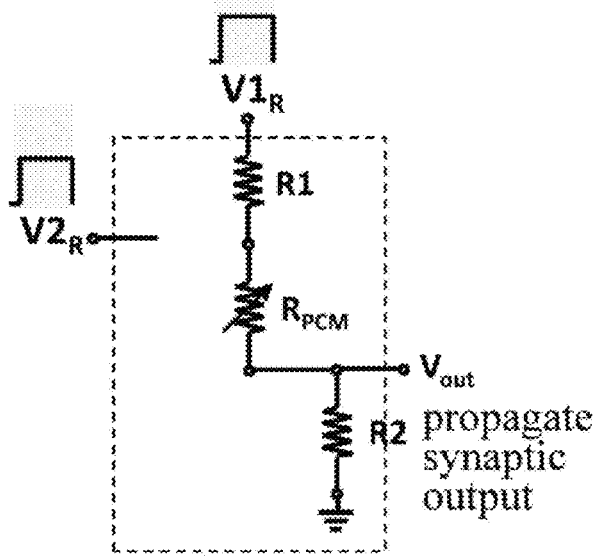
Figure 15C:
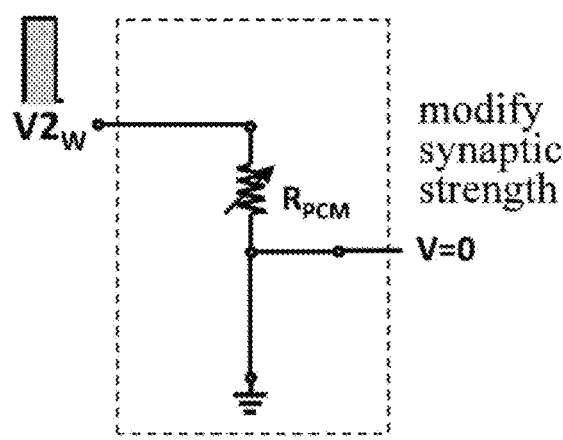

FIG. 15C shows the circuit configuration when the pre-neuron and post-neuron circuits fire together such that action signals V1 and V2 are applied simultaneously to the synapse input terminals. The upper portion of the figure shows the configuration on application of the read portions V1$_R$ and V2$_R$ at terminals 84 and 85 respectively. Both S1 and S2 are open, and the resulting operation is identical to that of FIG. 15A. Hence, cell 83 is operated in a read mode and a synaptic output signal is propagated to post-neuron circuit 82. The lower portion of the figure shows the configuration on simultaneous application of the write portions V1$_W$ and V2$_W$ at input terminals 84, 85. Switch S1 is closed, shorting resistance R2. The voltage at output terminal 86 is thus 0 V, and there is no propagation of synaptic potential to post-neuron circuit 82. Here, however, switch S2 is also closed, isolating resistance R1. This effects a programming mode of operation in which V2$_W$ is applied to the cell as a programming signal. The amplitude of write portion V2$_W$ is above the level required for threshold switching, whereby the cell current effects re-programming of the cell resistance. The operating parameters in this embodiment are set such that application of the programming signal V2$_W$ produces an incremental reduction in cell-resistance. In particular, with cell 83 in the high-resistance state prior to synapse operation, the accumulation characteristic of the cell means that cell-resistance will gradually decrease towards the low-resistance state with successive applications of the programming signal V2$_W$. Hence, synaptic weight will gradually increase with successive simultaneous firings of the pre- and post-neuron circuits. The write portion of the action signal format is thus used to implement the synaptic learning function by programming cell resistance. The read portion is used to propagate the synaptic potential to the post-neuron in the read mode. The switches S1 and S2 are used to distinguish between read and write events. Resistances R1 and R2 are selected such that synaptic change, due to re-programming of the cell, is inhibited if only one of the pre- and post-neuron action signals is present at the input terminals.

The similar structure of the FIG. 12 neuron and FIG. 14 synapse facilitates design of a PCM-centric neural hardware. The use of such similar neuron and synapse designs also offers the possibility of reconfigurable neuron-synapse operation.

Various modifications can be envisaged to the FIG. 12 neuron. For example, a diode may be connected between the read resistance and output terminal 75 to avoid propagation of the small read signal generated before firing. A single-level read portion may also be employed for neuron input signals, and an output circuit may be included to generate a desired output spike shape.

Numerous other changes and modifications may of course be made to the embodiments described. For example, PCM cell designs other than the mushroom cell arrangement can be utilized, as well as other resistive memory cells. Some examples include resistive RAM (RRAM) cells such as conductive bridge RRAM cells, oxide or metal-oxide RRAM cells, and carbon RRAM cells.

Figure 16:
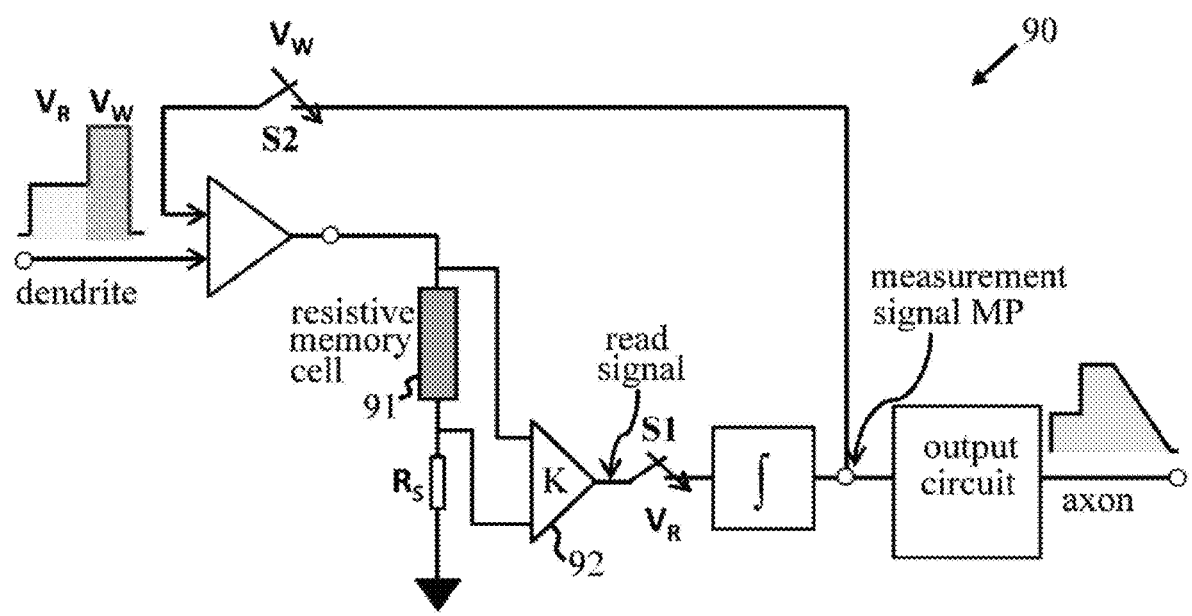
FIG. 16 shows a further neuron apparatus embodying the invention.

The circuit examples above have been described for operation in which the neuron fires, generating the output signal, in a first, low-resistance state of the memory cell, and the cell is then reset to a second, high-resistance state. During the accumulation phase, the cell-resistance is thus progressively reduced by successive neuron input signals. Other embodiments may be based on operation in which the neuron fires when the cell is in a high-resistance state, the cell is reset to a low-resistance state, and cell-resistance is progressively increased by successive neuron input signals in the accumulation phase. Any resistive memory cell, which may include bipolar devices, in which resistance can be progressively increased, may be used in such embodiments, one example being CBRAM (conductive bridge RAM) cells. FIG. 16 illustrates an exemplary circuit structure for such an embodiment. This neuron apparatus 90 corresponds generally to that of FIG. 4, and only key differences are described here. The resistive memory cell 91 is connected to a series resistor R$_S$, and the read circuit includes an operational amplifier 92 connected across the cell 91. The voltage at the amplifier input thus varies as R$_{cell}$/(R$_{cell}$+R$_S$), where R$_{cell}$ is the cell-resistance. During the accumulation phase, R$_{cell}$ increases from an initial low-resistance value Rmin to a high-resistance value Rmax (Rmin<<Rmax), and R$_S$≈Rmax. The amplifier input voltage is low when R$_{cell}$=Rmin, progressively increasing to a high value at R$_{cell}$=Rmax as the neuron state evolves in the accumulation phase. The remainder of this circuit operates generally as described for FIG. 4, with the measurement signal MP in the high-resistance cell-state being applied via switch S2 to reset the cell to the initial low-resistance state. Various alternative circuit designs can be envisaged here, for example as described for the earlier embodiments above.

In general, features of different embodiments may be interchanged as appropriate. Also, where a component is described herein as connected to another component, in general such components may be connected directly or indirectly, e.g., via intervening components, unless otherwise indicated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An artificial neuron apparatus comprising:
   a resistive memory cell;
   a first input terminal for applying neuron input signals to the memory cell, each neuron input signal comprising a read portion and a write portion;
   a read circuit for producing a read signal dependent on a resistance of the memory cell;
   an output terminal for providing a neuron output signal dependent on the read signal in a first state of the memory cell, the first state being one of a low-resistance state and a high-resistance state;
   a storage circuit for storing a measurement signal, the measurement signal being based on the resistance of the memory cell and dependent on the read signal; and
   a switch set operable to supply the read signal to the storage circuit during application of the read portion of each neuron input signal to the memory cell, and, after application of the read portion, to apply the measurement signal in the artificial neuron apparatus to enable resetting of the memory cell from the first state to a second state of the memory cell, the second state being the other of the low-resistance state and the high-resistance state, wherein the read circuit comprises a read resistance either connected between the memory cell and a reference terminal, or connected in parallel with the storage circuit, the switch set comprises a first switch, operable in response to the read portion of a neuron input signal, to supply the read signal to the storage circuit during application of that read portion to the memory cell, and the artificial neuron apparatus is adapted so that the resistance of the memory cell is progressively changed from the second state to the first state by application of the write portions of successive neuron input signals to the memory cell.

2. The artificial neuron apparatus as claimed in claim 1, wherein the first state is the low-resistance state, and the artificial neuron apparatus is further adapted so that the resistance of the memory cell is progressively reduced by application of the write portions of successive neuron input signals to the memory cell.

3. The artificial neuron apparatus as claimed in claim 2, wherein each neuron input signal further comprises a reset portion after either the read portion of the neuron input signal or the write portion of the neuron input signal, the artificial neuron apparatus further comprises a second input terminal for receiving, during the reset portion of each neuron input signal, a reset signal for resetting the memory cell from the low-resistance state to the high-resistance state, and the switch set further comprises:
  a second switch, operable in response to the measurement signal in the low-resistance state of the memory cell, to connect the second input terminal to the memory cell; and
  a third switch, operable in response to application of the reset signal at to the second input terminal, to apply the measurement signal to the second switch.

4. The artificial neuron apparatus as claimed in claim 3, wherein the read resistance is connected between the memory cell and the reference terminal.

5. The artificial neuron apparatus as claimed in claim 4, further comprising a fourth switch connected between the memory cell and the reference terminal, the fourth switch being operable, in response to each of the reset signal and the write portion of each neuron input signal, to short the read resistance.

6. The artificial neuron apparatus as claimed in claim 5, wherein the reset portion of each neuron input signal follows the read portion of the neuron input signal, and the output terminal is connected to the read circuit so that the neuron output signal comprises the read signal in the low-resistance state of the memory cell.

7. The artificial neuron apparatus as claimed in claim 6, wherein the memory cell comprises a phase-change memory cell.

8. The artificial neuron apparatus as claimed in claim 1, wherein the first state is the high-resistance state, and the artificial neuron apparatus is further adapted so that the resistance of the memory cell is progressively increased by application of the write portions of successive neuron input signals to the memory cell.

9. The artificial neuron apparatus as claimed in claim 1, wherein the artificial neuron apparatus is further adapted so that the measurement signal increases as the resistance of the memory cell progresses between the second state and the first state, and the storage circuit comprises an integrator circuit.

10. The artificial neuron apparatus as claimed in claim 9, wherein the integrator circuit comprises a leaky integrator circuit.

11. The artificial neuron apparatus as claimed in claim 1, wherein the switch set is further operable to supply the measurement signal to the first input terminal during application of the write portion of each neuron input signal to the memory cell, and the artificial neuron apparatus is further adapted so that, in the first state of the memory cell, supply of the measurement signal to the first input terminal effects resetting of the memory cell to the second state.

12. The artificial neuron apparatus as claimed in claim 11, further comprising an adder for adding the measurement signal to the write portion of each neuron input signal.

13. The artificial neuron apparatus as claimed in claim 11, wherein the switch set is configurable in response to a the neuron input signal.

14. The artificial neuron apparatus as claimed in claim 13, wherein the switch set further comprises a second switch, operable in response to the write portion of a neuron input signal, to supply the measurement signal to the first input terminal during application of that write portion to the memory cell.

15. The artificial neuron apparatus as claimed in claim 14, wherein the first state is the low-resistance state.

16. The artificial neuron apparatus as claimed in claim 14, further comprising an output circuit for receiving the measurement signal and generating the neuron output signal at the output terminal in the first state of the memory cell.

17. The artificial neuron apparatus as claimed in claim 14, wherein the memory cell comprises a phase-change memory cell.

18. The artificial neuron apparatus as claimed in claim 1, wherein each neuron input signal further comprises a reset portion after the write portion of the neuron input signal, the artificial neuron apparatus further comprises:
  a second input terminal for receiving, during the reset portion of each neuron input signal, a reset signal for resetting the memory cell from the first state to the second state;
  an output circuit comprising a comparator for producing a control signal in response to the measurement signal in the first state of the memory cell; and
  a signal generator for supplying the neuron output signal to the output terminal in response to the control signal, and the switch set further comprises:
  a second switch, operable in response to the reset portion of a neuron input signal, to supply the measurement signal to the output circuit during application of that reset portion to the memory cell; and
  a third switch, operable in response to the control signal, to connect the second input terminal to the memory cell.

19. The artificial neuron apparatus as claimed in claim 18, wherein the first state is the low-resistance state, and the read resistance is connected between the memory cell and the reference terminal.

20. The artificial neuron apparatus as claimed in claim 18, wherein the memory cell comprises a phase-change memory cell.

21. The artificial neuron apparatus as claimed in claim 1, wherein the read resistance is connected between the memory cell and the reference terminal.

22. The artificial neuron apparatus as claimed in claim 1, wherein the read resistance is connected in parallel with the storage circuit, and the first switch is connected between the memory cell and the read resistance connected in parallel with the storage circuit.

23. A neuromorphic system comprising:

an artificial neuron apparatus comprising:

a resistive memory cell;

a first input terminal for applying neuron input signals to the memory cell, each neuron input signal comprising a read portion and a write portion;

a read circuit for producing a read signal dependent on a resistance of the memory cell;

an output terminal for providing a neuron output signal dependent on the read signal in a first state of the memory cell, the first state being one of a low-resistance state and a high-resistance state;

a storage circuit for storing a measurement signal, the measurement signal being based on the resistance of the memory cell and dependent on the read signal; and a switch set operable to supply the read signal to the storage circuit during application of the read portion of each neuron input signal to the memory cell, and, after application of the read portion, to apply the measurement signal in the artificial neuron apparatus to enable resetting of the memory cell from the first state to a second state of the memory cell, the second state being the other of the low-resistance state and the high-resistance state, wherein the read circuit comprises a read resistance either connected between the memory cell and a reference terminal, or connected in parallel with the storage circuit, the switch set comprises a first switch, operable in response to the read portion of a neuron input signal, to supply the read signal to the storage circuit during application of that read portion to the memory cell, the artificial neuron apparatus is adapted so that the resistance of the memory cell is progressively changed from the second state to the first state by application of the write portions of successive neuron input signals to the memory cell, the switch set is further operable to supply the measurement signal to the first input terminal during application of the write portion of each neuron input signal to the memory cell, and the artificial neuron apparatus is further adapted so that, in the first state of the memory cell, supply of the measurement signal to the first input terminal effects resetting of the memory cell to the second state; and an input signal generator for generating at least one of the neuron input signals.

24. A neuromorphic system comprising:

an artificial neuron apparatus comprising:

a resistive memory cell;

a first input terminal for applying neuron input signals to the memory cell, each neuron input signal comprising a read portion and a write portion;

a read circuit for producing a read signal dependent on a resistance of the memory cell;

an output terminal for providing a neuron output signal dependent on the read signal in a first state of the memory cell, the first state being one of a low-resistance state and a high-resistance state;

a storage circuit for storing a measurement signal, the measurement signal being based on the resistance of the memory cell and dependent on the read signal; and a switch set operable to supply the read signal to the storage circuit during application of the read portion of each neuron input signal to the memory cell, and, after application of the read portion, to apply the measurement signal in the artificial neuron apparatus to enable resetting of the memory cell from the first state to a second state of the memory cell, the second state being the other of the low-resistance state and the high-resistance state, wherein the artificial neuron apparatus is adapted so that the resistance of the memory cell is progressively changed from the second state to the first state by application of the write portions of successive neuron input signals to the memory cell, each neuron input signal further comprises a reset portion after the write portion thereof, the artificial neuron apparatus further comprises:

a second input terminal for receiving, during the reset portion of each neuron input signal, a reset signal for resetting the memory cell from the first state to the second state;

an output circuit comprising a comparator for producing a control signal in response to the measurement signal in the first state of the memory cell; and a signal generator for supplying the neuron output signal to the output terminal in response to the control signal, and the switch set further comprises:

a first switch, operable in response to the read portion of a neuron input signal, to supply the read signal to the storage circuit during application of that read portion to the memory cell;

a second switch, operable in response to the reset portion of a neuron input signal, to supply the measurement signal to the output circuit during application of that reset portion to the memory cell; and a third switch, operable in response to the control signal, to connect the second input terminal to the memory cell; and an input signal generator for generating at least one of the neuron input signals, the input signal generator being adapted so that the read portion of each neuron input signal precedes the write portion of the neuron input signal.

25. A neuromorphic system comprising:

an artificial neuron apparatus comprising:

a resistive memory cell;

a first input terminal for applying neuron input signals to the memory cell, each neuron input signal comprising a read portion and a write portion;

a read circuit for producing a read signal dependent on a resistance of the memory cell;

an output terminal for providing a neuron output signal dependent on the read signal in a first state of the memory cell, the first state being one of a low-resistance state and a high-resistance state;

a storage circuit for storing a measurement signal, the measurement signal being based on the resistance of the memory cell and dependent on the read signal; and a switch set operable to supply the read signal to the storage circuit during application of the read portion of each neuron input signal to the memory cell, and, after application of the read portion, to apply the measurement signal in the artificial neuron apparatus to enable resetting of the memory cell from the first state to a second state of the memory cell, the second state being the other of the low-resistance state and the high-resistance state, wherein the artificial neuron apparatus is adapted so that the resistance of the memory cell is progressively changed from the second state to the first state by application of the write portions of successive neuron input signals to the memory cell, the first state is the low-resistance state, the artificial neuron apparatus is further adapted so that the resistance of the memory cell is progressively reduced by application of the write portions of successive neuron input signals to the memory cell, cell;

each neuron input signal further comprises a reset portion after the read portion of the neuron input signal, the artificial neuron apparatus further comprises a second input terminal for receiving, during the reset portion of each neuron input signal, a reset signal for resetting the memory cell from the low-resistance state to the high-resistance state, and the switch set comprises:
  a first switch, operable in response to the measurement signal in the low-resistance state of the memory cell, to connect the second input terminal to the memory cell; and
  a second switch, operable in response to application of the reset signal to the second input terminal, to apply the measurement signal to the first switch; and an input signal generator for generating at least one of the neuron input signals, the input signal generator being adapted so that the road write portion of each neuron input signal precedes the read portion of the neuron input signal, the read portion of each neuron input signal comprises a first segment and a second segment, and the second segment follows the first segment and has a lower signal level than the first segment.

26. A neuromorphic system comprising:
an artificial neuron apparatus comprising:
  a resistive memory cell;
  a first input terminal for applying neuron input signals to the memory cell, each neuron input signal comprising a read portion and a write portion;
  a read circuit for producing a read signal dependent on a resistance of the memory cell;
  an output terminal for providing a neuron output signal dependent on the read signal in a first state of the memory cell, the first state being one of a low-resistance state and a high-resistance state;
  a storage circuit for storing a measurement signal, the measurement signal being based on the resistance of the memory cell and dependent on the read signal; and
  a switch set operable to supply the read signal to the storage circuit during application of the read portion of each neuron input signal to the memory cell, and, after application of the read portion, to apply the measurement signal in the artificial neuron apparatus to enable resetting of the memory cell from the first state to a second state of the memory cell, the second state being the other of the low-resistance state and the high-resistance state,
  wherein the artificial neuron apparatus is adapted so that the resistance of the memory cell is progressively changed from the second state to the first state by application of the write portions of successive neuron input signals to the memory cell,
  the first state is the low-resistance state,
  the artificial neuron apparatus is further adapted so that the resistance of the memory cell is progressively reduced by application of the write portions of successive neuron input signals to the memory cell,
  each neuron input signal further comprises a reset portion after the read portion of the neuron input signal,
  the artificial neuron apparatus further comprises a second input terminal for receiving, during the reset portion of each neuron input signal, a reset signal for resetting the memory cell from the low-resistance state to the high-resistance state,
  the switch set comprises:
    a first switch, operable in response to the measurement signal in the low-resistance state of the memory cell, to connect the second input terminal to the memory cell; and
    a second switch, operable in response to application of the reset signal at to the second input terminal, to apply the measurement signal to the first switch,
  the read circuit comprises a read resistance connected between the memory cell and a reference terminal,
  the artificial neuron apparatus further comprises a third switch connected between the memory cell and the reference terminal, the third switch being operable, in response to each of the reset signal and the write portion of each neuron input signal, to short the read resistance, and
  the output terminal is connected to the read circuit so that the neuron output signal comprises the read signal in the low-resistance state of the memory cell; and
an input signal generator for generating at least one of the neuron input signals.

* * * * *